US012748494B2

(12) United States Patent
Steinmetz et al.

(10) Patent No.: US 12,748,494 B2
(45) Date of Patent: Sep. 29, 2026

(54) 3D BRAIN-CLICK USING BINOCULAR DISPLAY

(71) Applicant: Snap Inc., Santa Monica, CA (US)

(72) Inventors: Nelson Steinmetz, Paris (FR); Bertrand Oustrière, Paris (FR); Robin Zerafa, Chatou (FR); Antoine Barbot, Paris (FR); Nicolas Barascud, Brinckheim (FR)

(73) Assignee: Snap Inc., Santa Monica, CA (US)

( * ) Notice: Subject to any disclaimer, the term of this patent is extended or adjusted under 35 U.S.C. 154(b) by 161 days.

(21) Appl. No.: 18/759,189

(22) Filed: Jun. 28, 2024

(65) Prior Publication Data

US 2026/0003432 A1 Jan. 1, 2026

(51) Int. Cl.
*G06F 3/01* (2006.01)
*H04N 13/128* (2018.01)
(Continued)

(52) U.S. Cl.
CPC ........... *G06F 3/015* (2013.01); *H04N 13/128* (2018.05); *H04N 13/344* (2018.05); *H04N 13/383* (2018.05)

(58) Field of Classification Search
CPC .. G06F 3/04817; G06F 3/147; G06F 3/04845; G06F 3/011; G06F 3/0202;
(Continued)

(56) References Cited

U.S. PATENT DOCUMENTS

2003/0184860 A1* 10/2003 Hakkinen ................ G02B 7/12 351/178
2014/0268356 A1* 9/2014 Bolas ................... G02B 27/017 359/630

(Continued)

FOREIGN PATENT DOCUMENTS

WO WO-2021140247 A1 7/2021
WO WO-2026005965 A1 1/2026

OTHER PUBLICATIONS

"International Application Serial No. PCT/US2025/032458, International Search Report mailed Oct. 7, 2025", 4 pgs.

(Continued)

*Primary Examiner* — Shaheda A Abdin
(74) *Attorney, Agent, or Firm* — Schwegman Lundberg & Woessner, P.A.

(57) ABSTRACT

A method and system for detecting intentional selection of a user interface element using a binocular display. A first visual stimulus is presented stereoscopically to a user's eyes at a first virtual depth perceived by the user's depth perception and overlapping a first position within a field of view of the user. A second visual stimulus is presented stereoscopically to the user's eyes at a second virtual depth perceived by the user's depth perception and overlapping the first position. Neural signals are obtained from a neural signal capture device configured to detect neural activity of the user. In response to determining, based on the neural signals, that the user's eyes are focused on either the first visual stimulus or second visual stimulus, a computing system is (Continued)

placed into a first state or second state, respectively, associated with the first visual stimulus or second visual stimulus, respectively.

20 Claims, 16 Drawing Sheets

(51) Int. Cl.
*H04N 13/344* (2018.01)
*H04N 13/383* (2018.01)

(58) Field of Classification Search
CPC ...... G06F 3/013; G06F 3/03547; G06F 3/012; G06F 3/04842; G06F 3/04847; G06T 13/20; G06T 19/006; G06T 3/40; G02B 27/0172; G02B 27/0093; G02B 27/646; H04N 13/344
See application file for complete search history.

(56) References Cited

U.S. PATENT DOCUMENTS

| | | | | |
|---|---|---|---|---|
| 2016/0133170 | A1* | 5/2016 | Fateh | G06F 3/04817 345/428 |
| 2017/0148215 | A1 | 5/2017 | Aksoy et al. | |
| 2019/0167095 | A1* | 6/2019 | Krueger | A61B 3/113 |
| 2023/0284949 | A1* | 9/2023 | Kouider | A61B 5/168 |
| 2024/0211033 | A1 | 6/2024 | Wang et al. | |

OTHER PUBLICATIONS

"International Application Serial No. PCT/US2025/032458, Written Opinion mailed Oct. 7, 2025", 5 pgs.

Reddy, G. S. Rajshekar, et al., "Towards an Eye-Brain-Computer Interface: Combining Gaze with the Stimulus-Preceding Negativity for Target Selections in XR", CHI '24: Proceedings of the 2024 CHI Conference on Human Factors in Computing Systems, (May 11, 2024), 17 pgs.

* cited by examiner

3D BRAIN-CLICK USING BINOCULAR DISPLAY

TECHNICAL FIELD OF THE INVENTION

The present invention relates to the operation of brain-computer interfaces involving visual sensing, and in particular to brain-computer interfaces distinguishing between passive viewing and active selection of a user interface element.

BACKGROUND

In visual brain-computer interfaces (BCIs), neural responses to a target stimulus, generally among a plurality of generated visual stimuli presented to the user, are used to infer (or "decode") which stimulus is essentially the object of focus at any given time. The object of focus can then be associated with a user-selectable or -controllable action.

Neural responses may be obtained using a variety of known techniques. One convenient method relies upon surface electroencephalography (EEG), which is non-invasive, has fine-grained temporal resolution and is based on well-understood empirical foundations. Surface EEG makes it possible to measure the variations of diffuse electric potentials on the surface of the skull (i.e. the scalp) of a subject in real-time. These variations of electrical potentials are commonly referred to as electroencephalographic signals or EEG signals.

BRIEF DESCRIPTION OF THE SEVERAL VIEWS OF THE DRAWINGS

To easily identify the discussion of any particular element or act, the most significant digit or digits in a reference number may refer to the figure number in which that element is first introduced.

DETAILED DESCRIPTION

Figure 1:
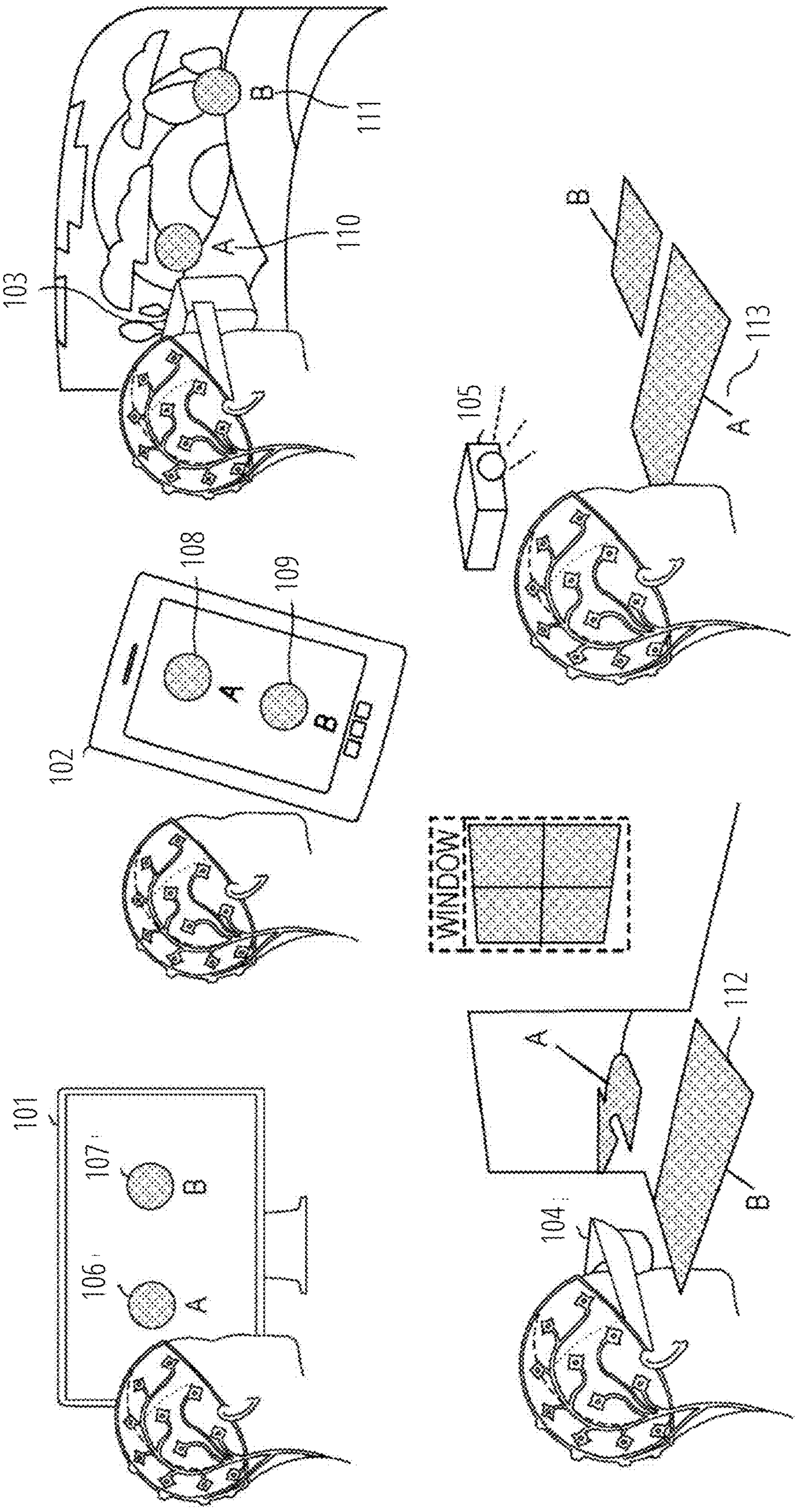
FIG. 1 illustrates various examples of display device suitable for use with systems and methods discussed herein, in accordance with some examples.

In a typical BCI, visual stimuli are presented in a display generated by a display device. Examples of suitable display devices (some of which are illustrated in FIG. 1) include television screens, computer monitors 101, projectors 105, virtual reality headsets 103, interactive whiteboards, and the display screens of tablets 102, smartphones, smart glasses 104, etc. The visual stimuli 106, 107, 108, 109, 110, 111, 112, and/or 113 may form part of a generated graphical user interface (GUI) or they may be presented as augmented reality or mixed reality graphical objects overlaying a base image: this base image may simply be the actual field of view of the user (as in the case of a mixed reality display function projected onto the otherwise transparent display of a set of smart glasses) or a digital image corresponding to the user's field of view but captured in real time by an optical capture device (which may in turn capture an image corresponding to the user's field of view amongst other possible views).

Some display devices provide binocular (or stereoscopic) imaging, such that three-dimensional virtual objects can be displayed. Binocular, stereoscopic, or three-dimensional display devices can include holographic displays, binocular head-mounted displays (HMDs), and so on. For example, a head-worn device may be implemented with a transparent or semi-transparent display through which a user of the head-worn device can view the surrounding environment. Such devices enable a user to see through the transparent or semi-transparent display to view the surrounding environment, and to also see objects or other content (e.g., virtual objects such as 3D renderings, images, video, text, and so forth) that are generated for display to appear as a part of, and/or overlaid upon, the surrounding environment (referred to collectively as "virtual content"). This is typically referred to as "extended reality" or "XR", and it encompasses techniques such as augmented reality (AR), virtual reality (VR), and mixed reality (MR). Each of these technologies combines aspects of the physical world with virtual content presented to a user.

Figure 11:
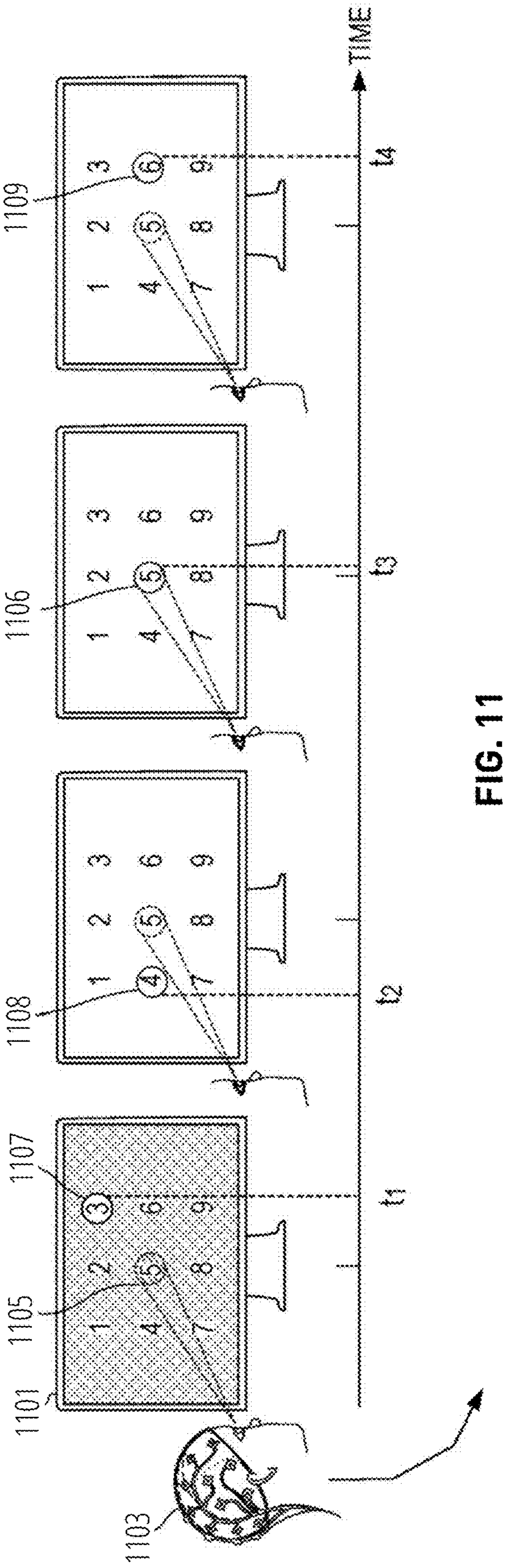
FIG. 11 illustrates a user focusing on an object while the screen objects, including the focus object, all blink at different rates and times, in accordance with some examples.

In a BCI, inferring which of a plurality of visual stimuli (if any) is the object of focus at any given time is fraught with difficulty. For example, when a user is facing multiple stimuli, such as for instance the digits displayed on an on-screen keypad (as shown in FIG. 11), it has proven nearly impossible to infer which one is under focus directly from brain activity at a given time. The user perceives the digit under focus, e.g., the digit "5", meaning that the brain must contain information that distinguishes that digit from others, but current methods are unable to extract that information. Specifically, current methods can, with difficulty, infer that a stimulus has been perceived, but they cannot determine which specific stimulus is under focus using brain activity alone.

To overcome this issue and to provide sufficient contrast between stimulus and background (and between stimuli), the stimuli used by visual BCIs can be configured to blink or pulse (e.g. large surfaces of pixels switching from black to white and vice-versa), so that each stimulus has a distinguishable characteristic profile over time. The flickering stimuli give rise to measurable electrical responses. Specific techniques monitor different electrical responses, for example steady state visual evoked potentials (SSVEPs) and P-300 event related potentials. In some implementations, the stimuli flicker at a rate exceeding 6 Hz. As a result, such visual BCIs rely on an approach that consists of displaying the various stimuli discretely rather than constantly, and typically at different points in time. Brain activity associated with attention focused on a given stimulus is found to correspond (i.e. correlate) with one or more aspect of the temporal profile of that stimulus, for instance the frequency of the stimulus blink and/or the duty cycle over which the stimulus alternates between a blinking state and a quiescent state.

Thus, decoding of neural signals relies on the fact that when a stimulus is turned on, it will trigger a characteristic pattern of neural responses in the brain that can be determined from electrical signals, i.e. the SSVEPs, picked up by electrodes of an EEG device, such as the electrodes of an EEG helmet. This neural data pattern might be very similar or even identical for the various digits, but it is time-locked to the digit being perceived: only one digit may pulse at any one time so that the correlation with a pulsed neural response and a time at which that digit pulses may be determined as an indication that that digit is the object of focus. By displaying each digit at different points in time, turning that digit on and off at different rates, applying different duty cycles, and/or simply applying the stimulus at different points in time, the BCI algorithm can establish which stimulus, when turned on, is most likely to be triggering a given neural response, thereby allowing a system to determine the target under focus.

Even after a target is determined to be in focus, visual computer interfaces such as the BCI described above face further challenges. One major challenge in the field of visual computer interfaces is the so-called "Midas Touch" Problem, where the user inadvertently generates an output action when simply looking at a target stimulus (the stimulus may be anywhere in the user's field of view including the focal area) without ever intending to trigger the related action. Indeed, it has proven difficult to estimate accurately whether a viewed target is only "explored" or whether the user also wishes to select that target to generate an output action.

In the field of eye-tracking, the Midas Touch Problem reflects the difficulty in estimating whether the user is fixing their gaze on a particular target for exploration or deliberately (for "selection" of that target and/or for generating an output action on the interface). This estimation is usually done by measuring dwell time: a timer is started when the (tracked) gaze enters a target area and is validated when the timer elapses (without significant divergence of gaze). However, dwell time can be inaccurate in estimating user intent, as it relies on a user's observation to infer interaction. Although eye-tracking information can be used to reliably reveal the user's gaze location, it has proven difficult to offer intentional control to the user, due to the inability to discriminate between mere observation of the (gazed-at) target by the user, referred to herein as exploration, and deliberate staring intended to express the user's will to trigger an action associated with the target, referred to herein as selection (or activating a selection state).

While the Midas Touch Problem is a major challenge in the field of eye-tracking based user interface, it also arises in visual BCIs. The user may wish to investigate or pay attention to a display object without ever meaning to control the object or trigger an associated action. Moreover, there are circumstances where the user of a BCI allows their gaze to linger on a screen object exhibiting a (decodable) visual stimulus despite the user not focusing any associated attention on the stimulus—e.g., the user may incidentally or arbitrarily fixate visually on the stimulus during a blank or vacant stare. It is desirable to discriminate such cases from cases where control or triggered action is intended.

Some examples described herein may provide improved techniques for operating a BCI to discriminate between a target upon which a user is focusing with the intention of triggering an action and a screen object that is merely being looked at (whether inadvertently or with intention only to investigate), and thereby attempt to address one or more of the above challenges.

In some examples, the present disclosure describes a computing system and method for distinguishing between exploration and selection user intent by using a binocular display to present visual stimuli at two different perceived depths (referred to as "virtual depths"). When a user focuses the left eye and right eye (jointly referred to herein as the user's "eyes", or "both eyes") on a first visual stimulus at a first virtual depth, the first visual stimulus is brought into visual focus, thereby permitting a BCI to decode a first modulation characteristic of the first visual stimulus from the user's EEG signals and determine that the user's eyes are focused on the first visual stimulus. Similarly, when the user focuses both eyes on a second visual stimulus at a second virtual depth, the second visual stimulus is brought into visual focus, thereby permitting a BCI to decode a second modulation characteristic of the second visual stimulus from the user's EEG signals and determine that the user's eyes are focused on the second visual stimulus. The modulation characteristic of each visual stimulus is only decodable from the EEG when the user's eyes are both focused on the respective visual stimulus: thus, the first visual stimulus and second visual stimulus can both be presented at overlapping locations in the user's field of vision, and the HCI can determine when a user switches focus between the first visual stimulus and the second visual stimulus by changing eye vergence and/or the focal distance of the eyes' lenses. In some examples, the BCI relies solely on the depth perceived by the user, using the user's stereoscopic vision, as the sole visual cue used to predict which of the visual stimuli is being focused on.

In some cases, the change in vergence between the first virtual depth and second virtual depth is quite subtle, such that the 2D presentation, on a screen or waveguide surface, of the virtual content representing the first visual stimulus and the virtual content representing the second visual stimulus overlaps in 2D space almost completely. This overlap may be complete enough that the two visual stimuli are generally perceived as forming only a single object on the 2D display surface. The ability of the HCI to distinguish between multiple eye focusing behaviors performed without moving the gaze from a given location within the field of view (due to the overlap of the two visual stimuli), but only changing vergence, can be leveraged for any of a number of purposes. In some examples, a change in focus between the first virtual depth and the second virtual depth at the same location can be performed by the user to indicate an intent to select a GUI element, as distinct from passively viewing the GUI element: this intentional change in focus (e.g., from a first visual stimulus at a relatively near first virtual depth to a second visual stimulus at a relatively far second virtual depth) may be referred to herein as a "brain-click", analogous to a mouse-click when a mouse cursor is hovering over a GUI element. In some examples, multiple visual stimuli can be presented at multiple virtual depths, and the user's intentional change of focus along the range between near and far visual stimuli can be detected to select a value from a range of values for a variable used by the computing system. In some examples, multiple such visual stimuli can be used to determine a user's inter-pupillary distance (IPD). Virtual objects presented by a binocular display (such as a head-mounted binocular display device having a left near-eye display and a right near-eye display) are perceived to be at different virtual depths by users having different IPDs, and a head-mounted binocular display can exploit the relationship between IPD and perceived depth of a virtual object in order to measure a user's IPD using techniques described herein. Multiple visual stimuli can be presented at multiple virtual depths, and the user can be prompted to focus on a real-world object (such as a fingertip, a wall, or another physical object in the real world) having a known distance from the display device and therefore from the user's eyes (e.g., a distance that is measured using sensors of the device, such as optical and/or depth sensors). By overlapping the presentation of the visual stimuli with the real-world object in the user's field of view, the HCI can determine which of the visual stimuli the user's eyes are focused on, and thereby infer the vergence and/or focal distance of the user's eyes when focused on the real-world physical object at the known real-world depth or distance. The user's IPD can be calculated based on the virtual depth of the visual stimulus matching the focus of the user's eyes at the known real-world depth.

In some examples, the two or more visual stimuli are presented such that they appear to form a single virtual object, such as a GUI element. The user can then change focus when looking at the virtual object to switch focus between the first visual stimulus and second visual stimulus (and/or additional visual stimuli). In some examples, the first visual stimulus and second visual stimulus appear as a single GUI element, in the context of a GUI having multiple elements arranged at the first virtual depth. This allows a user to visually traverse various GUI elements at the first virtual depth, including the first visual stimulus, without triggering any behaviors associated with the change of focus to a different virtual depth. When the user's gaze dwells on the location within the field of view of the first visual stimulus, and then changes focus to the second virtual depth, this change in focus is detected due to the visual focus on the second visual stimulus with its characteristic modulation, which can be detected as a "brain-click" and/or a change in a variable value as described above. In some examples, the first virtual depth is closer to the user's eyes than the second virtual depth; in some such cases, changing focus from the first virtual depth to the second virtual depth may be referred to as "diving in" to the virtual object comprising the first visual stimulus and second visual stimulus.

In experimental testing, the techniques described herein have shown significant precision, allowing some users to intentionally and detectably change focus between two visual targets at a virtual depth of approximately 80 cm from the user's eyes and differing in virtual depth by less than 8 centimeters. This performance compares very favorably to the precision of most current eye tracking techniques, and may provide a more accurate technique for tracking vergence and/or focal distance than most existing camera-based eye tracking systems.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 2:
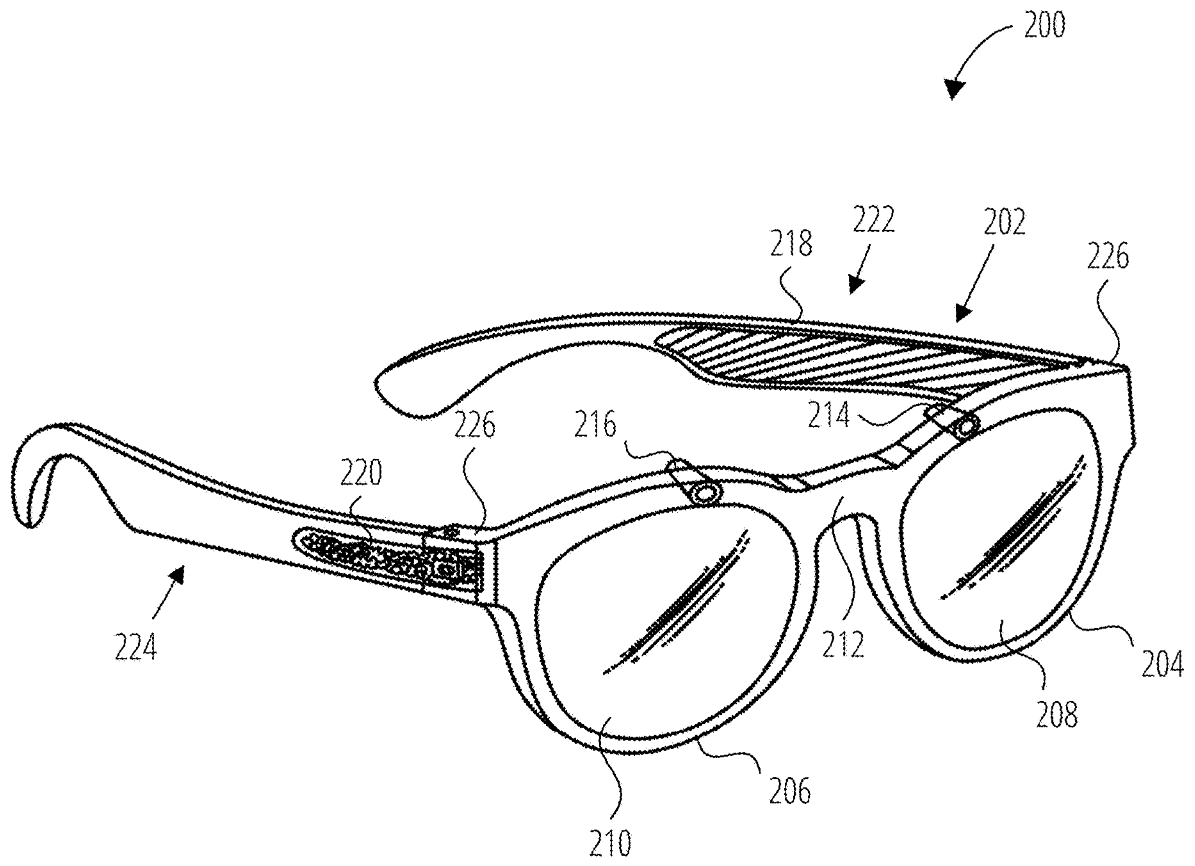
FIG. 2 is a perspective view of a head-worn device, in accordance with some examples.

FIG. 2 is perspective view of a head-worn AR device (e.g., glasses 200), in accordance with some examples. The glasses 200 can include a frame 202 made from any suitable material such as plastic or metal, including any suitable shape memory alloy. In one or more examples, the frame 202 includes a first or left optical element holder 204 (e.g., a display or lens holder) and a second or right optical element holder 206 connected by a bridge 212. A first or left optical element 208 and a second or right optical element 210 can be provided within respective left optical element holder 204 and right optical element holder 206. The right optical element 210 and the left optical element 208 can be a lens, a display, a display assembly, or a combination of the foregoing. Any suitable display assembly can be provided in the glasses 200.

The frame 202 additionally includes a left arm or temple piece 222 and a right arm or temple piece 224. In some examples the frame 202 can be formed from a single piece of material so as to have a unitary or integral construction.

The glasses 200 can include a computing device, such as a computer 220, which can be of any suitable type so as to be carried by the frame 202 and, in one or more examples, of a suitable size and shape, so as to be partially disposed in one of the temple piece 222 or the temple piece 224. The computer 220 can include one or more processors with memory, wireless communication circuitry, and a power source. Various other examples may include these elements in different configurations or integrated together in different ways. In some examples, the computer 220 can implement some or all of the functions of a computing system configured to perform methods and operations described herein, such as the machine 1400 described in reference to FIG. 14 below.

The computer 220 additionally includes a battery 218 or other suitable portable power supply. In some examples, the battery 218 is disposed in left temple piece 222 and is electrically coupled to the computer 220 disposed in the right temple piece 224. The glasses 200 can include a connector or port (not shown) suitable for charging the battery 218, a wireless receiver, transmitter or transceiver (not shown), or a combination of such devices.

The glasses 200 include a first or left camera 214 and a second or right camera 216. Although two cameras are depicted, other examples contemplate the use of a single or additional (i.e., more than two) cameras. In one or more examples, the glasses 200 include any number of input sensors or other input/output devices in addition to the left camera 214 and the right camera 216, such as one or more optical calibration sensors, eye tracking sensors, ambient light sensors, and/or environment sensors, as described below. Such sensors or input/output devices can additionally include location sensors, motion sensors, and so forth. In some examples, the optical calibration sensors, eye tracking sensors, ambient light sensors, and/or environment sensors can include the left camera 214 and/or right camera 216: for example, the left camera 214 and/or right camera 216 may be used as the ambient light sensor to detect ambient light, and may also be used as at least part of a suite of environment sensors to detect environmental conditions around a user of the glasses 200. It will be appreciated that the cameras 214, 216 are a form of optical sensor, and that the glasses 200 may include additional types of optical sensors in some examples.

In some examples, the left camera 214 and the right camera 216 provide video frame data for use by the glasses 200 to extract 3D information from a real world scene.

Figure 3:
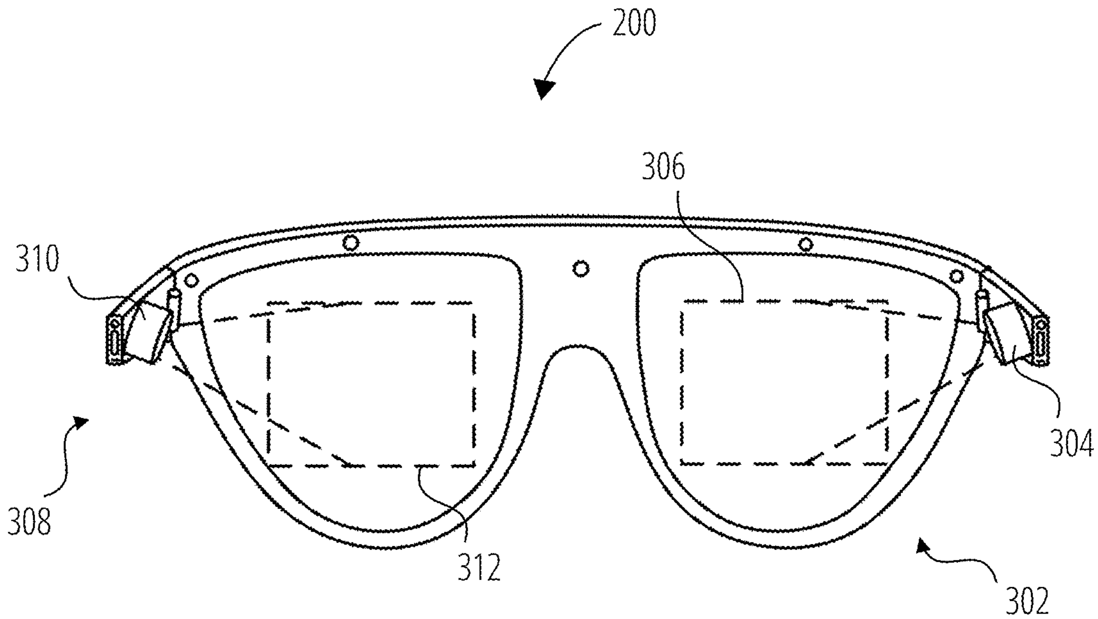
FIG. 3 illustrates a further view of the head-worn device of FIG. 2, in accordance with some examples.

FIG. 3 illustrates the glasses 200 from the perspective of a user. For clarity, a number of the elements shown in FIG. 2 have been omitted. As described in FIG. 2, the glasses 200 shown in FIG. 3 include left optical element 208 and right optical element 210 secured within the left optical element holder 204 and the right optical element holder 206 respectively.

The glasses 200 include right forward optical assembly 302 comprising a right projector 304 and a right image presentation component 306, and a left forward optical assembly 308 including a left projector 310 and a left image presentation component 312. The right forward optical assembly 302 may also be referred to herein, by itself or in combination with the right optical element 210, as a right near-eye optical see-through XR display or simply a right near-eye display. The left forward optical assembly 308 may also be referred to herein, by itself or in combination with the left optical element 208, as a left near-eye optical sec-through XR display or simply a left near-eye display.

In some examples, the image presentation components 306 are waveguides. The waveguides include reflective or diffractive structures (e.g., gratings and/or optical elements such as mirrors, lenses, or prisms). Projected light emitted by the projector 304 encounters the diffractive structures of the waveguide of the image presentation component 306, which directs the light towards the right eye of a user to provide an image on or in the right optical element 210 that overlays the view of the real world seen by the user. Similarly, projected light emitted by the projector 310 encounters the diffractive structures of the waveguide of the image presentation component 312, which directs the light towards the left eye of a user to provide an image on or in the left optical element 208 that overlays the view of the real world seen by the user. The combination of a GPU, the right forward optical assembly 302, the left optical element 208, and the right optical element 210 provide an optical engine of the glasses 200. The glasses 200 use the optical engine to generate an overlay of the real world view of the user including display of a 3D user interface to the user of the glasses 200. The surface of the optical element 208 or 210 from which the projected light exits toward the user's eye is referred to as a user-facing surface or an image presentation surface of the near-eye optical see-through XR display.

It will be appreciated that other display technologies or configurations may be utilized within an optical engine to display an image to a user in the user's field of view. For example, instead of a projector 304 and a waveguide, an LCD, LED or other display panel or surface may be provided.

In use, a user of the glasses 200 will be presented with information, content and various 3D user interfaces on the near eye displays. As described in more detail herein, the user can then interact with the glasses 200 using the buttons 226, voice inputs or touch inputs on an associated device, and/or hand movements, locations, and positions detected by the glasses 200. In some examples, as described below, a user may also provide control input to the glasses 200 using eye gestures tracked by an eye tracking subsystem.

In some examples, one or more further optical lenses may be used to adjust the presentation of the virtual content to the user's eye. For example, lenses can be placed on the user-facing side and/or the exterior side of the image presentation component (e.g., image presentation component 306 or 312) to modulate the plane in front of the user's eye where that the virtual content appears, i.e., to adjust the perceived distance of the virtual content from the user's eye by adjusting the focal distance of the virtual content (in addition to vergence adjustments that can be achieved by binocular displacement of the virtual content, as described below with reference to FIG. 4 to FIG. 8). The near user-facing side lens affects the perceived distance of the virtual content in front of the user; while the exterior side lens is provided to neutralize the effect of the near side lens on real-world objects. In some examples, an ophthalmic lens can be positioned on the user-facing side of the image presentation component (e.g., image presentation component 306 or 312) to allow users needing visual correction to correctly perceive the virtual content. In some examples, dynamic ophthalmic lenses can be used that are configured to vary the focal distance of the displayed virtual content.

It will be appreciated that examples described herein can be combined with various XR display designs.

Figure 4:
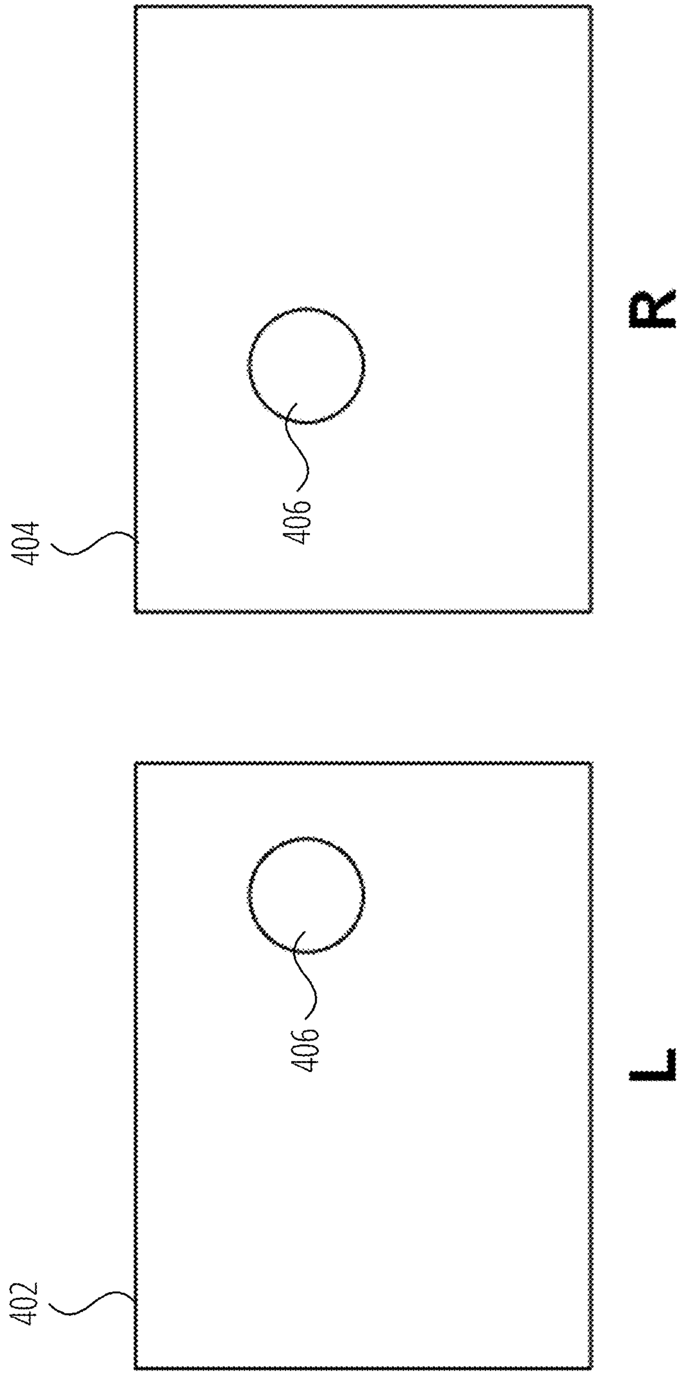
FIG. 4 is a rear view of the eye-facing sides of a left near-eye display and a right near-eye display presenting virtual content, in accordance with some examples.

FIG. 4 is a rear view (e.g., the same view as FIG. 3) of the eye-facing sides of a left near-eye display 402 and a right near-eye display 404 presenting virtual content 406. The point of view of FIG. 4 is roughly that of the user's eyes; the virtual content 406 presented by the left near-eye display 402 is presented to the user's left eye, and the virtual content 406 presented by the right near-eye display 404 is presented to the user's right eye.

The position occupied by the virtual content 406 in each near-eye display may be determined by coordinates of pixels stimulated to emit light representing the virtual content 406 in the context of conventional screens, or may be determined by the angles of light propagating from one or more exit pupils of a waveguide in the context of waveguide-based displays having output diffraction gratings. The intent of the depiction in FIG. 4 is to show that each eye may rotate to a different angle to bring the virtual object represented by the virtual content 406 into visual focus.

The difference in the position of the virtual content 406 on the surface of the left near-eye display 402 relative to the right near-eye display 404 indicates that the left eye and right eye will converge at a depth (e.g., into the plane of the drawing) that is perceived by the user as an actual depth of the virtual object represented by the virtual content 406 due to the user's depth perception, and which is referred to as the virtual depth of the virtual object. When the user's eyes converge on the virtual object as a result of each eye focusing on the virtual content 406 presented stereoscopically by its respective near-eye display, the virtual object is perceived as occupying a single position in the user's field of view. The phenomenon of vergence as it relates to the virtual depth of a virtual object, and how this phenomenon can be expiated by examples described herein, is explained in more detail with reference to FIG. 5 through FIG. 7 below.

Figure 5:
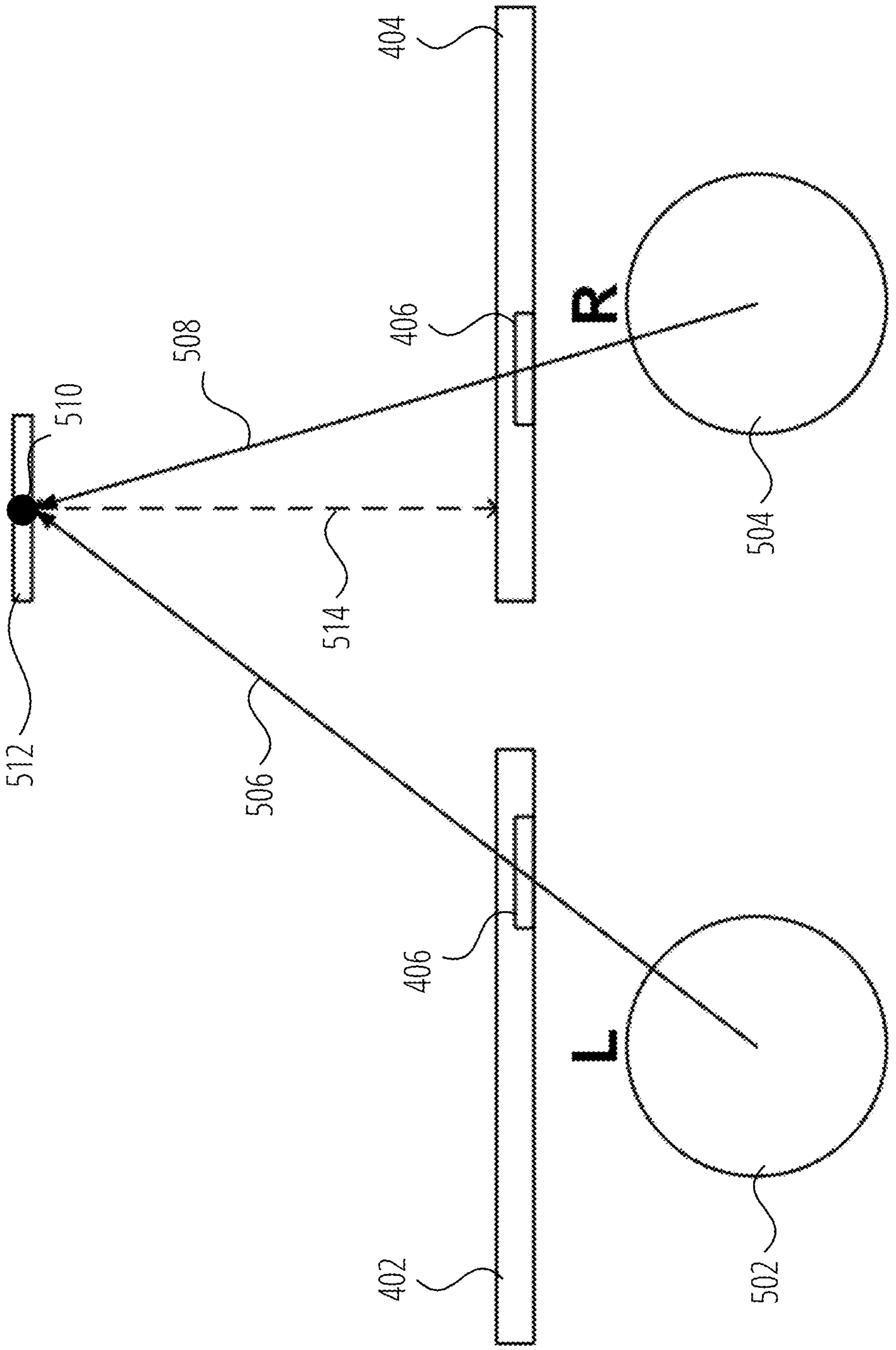
FIG. 5 is a top view of the left near-eye display and right near-eye display of FIG. 4 showing the virtual depth of the virtual content, in accordance with some examples.

FIG. 5 is a top view of the left near-eye display 402 and right near-eye display 404 of FIG. 4. In FIG. 5, the virtual object represented by the virtual content 406 is shown as visual stimulus 512, which is perceived by the user as being at virtual depth 514 as a result of the vergence of the user's left gaze vector 506 from the left eye 502 with the user's right gaze vector 508 from the right eye 504 at virtual depth 514. The visual stimulus 512 is perceived as being centered on, or overlapping, a first position 510 within the user's field of view.

In some examples, the visual stimulus 512 can be presented as a stimulus having a characteristic modulation suitable for detection by a BCI, as described in greater detail below. The BCI can detect the modulation from the user's neural signals when the user's eyes 502 and 504 are both focused on the visual stimulus 512, and not otherwise. This allows the BCI to determine when the user is and is not focusing both eyes on the visual stimulus 512 at the virtual depth 514.

It will be appreciated that the virtual depth 514 of a virtual object is formally defined with reference to a midpoint between the pupils of the user's eyes, but in practice the virtual depth 514 can be defined in relation to any of a number of reference points, such as one of the user's eyes, a midpoint of the frames of the glasses 200, a location of a camera (e.g., left camera 214 or right camera 216) of the glasses or a midpoint therebetween, and so on. For virtual objects presented at a virtual depth on the scale of a meter or more, each of these reference points provides substantially the same results as using the midpoint between the pupils of the user's eyes. In some examples, the virtual depth 514 can be approximated by assuming a fixed average distance vector between the reference point used (e.g., a midpoint between the cameras of the glasses 200) and the midpoint between the pupils of the user's eyes.

Figure 6:
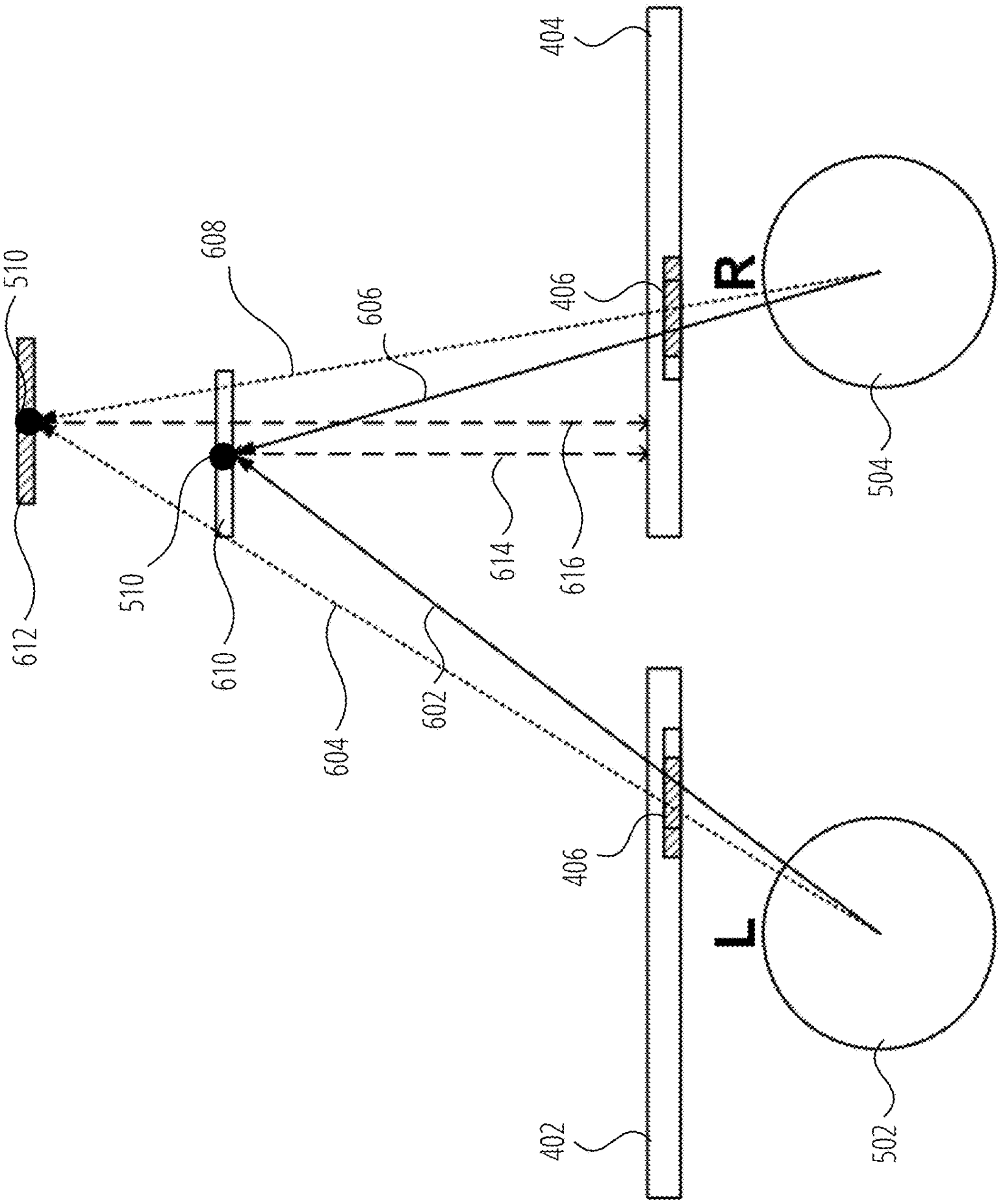
FIG. 6 is a top view of a left near-eye display and right near-eye display showing two distinct virtual depths of two visual stimuli, in accordance with some examples.

FIG. 6 is a top view of the left near-eye display 402 and right near-eye display 404 of FIG. 4 and FIG. 5. In FIG. 6, two distinct virtual objects are shown at two distinct virtual depths: first visual stimulus 610 at first virtual depth 614, and second visual stimulus 612 at second virtual depth 616. In the illustrated example, second virtual depth 616 is greater than first virtual depth 614.

In this illustrated example, the virtual content 406 presented on each near-eye display includes a representation of the first visual stimulus 610 and a representation of the second visual stimulus 612. These two representations will overlap, fully or partially, such that the first visual stimulus 610 and second visual stimulus 612 are both perceived at, or at least partially overlapping, the same first position 510 in the user's field of view. In some examples, the second visual stimulus 612 may be perceived as having a larger size (e.g., visible area) than the first visual stimulus 610, causing the first visual stimulus 610 and second visual stimulus 612 to fully eclipse or overlap each other despite being perceived to be at different virtual depths. In other examples, the first visual stimulus 610 and second visual stimulus 612 are perceived as having the same size. However, FIG. 6 shows the first visual stimulus 610 and second visual stimulus 612 as having the same size as virtual objects for the sake of simplicity and to account for the artificial foreshortening of the virtual depths in the illustrated example. The virtual objects and virtual depths shown in FIG. 6 are not necessarily to scale: the illustrated example, interpreted literally, would show the first virtual depth 614 and second virtual depth 616 as being on the order of 10 centimeters, whereas some examples are configured to present virtual objects having virtual depths on the order or 30 cm to 150 cm, or 60 cm to 2 meters, or 80 cm to 2 meters, or more. Examples described herein can be assumed to use virtual depths roughly in the range of 80 cm to 2 meters, even though shorter virtual depths are illustrated for clarity.

In some examples, a GUI may be presented on the left near-eye display 402 and right near-eye display 404 to show multiple GUI elements arranged at the first virtual depth 614. The user's eyes can traverse these GUI elements and dwell on them without triggering a selection state; instead, when the user's gaze vectors fixate or dwell on a GUI element at the first virtual depth 614, the computing system (e.g., the glasses 200, including its computer 220) may remain in an exploration state. Only when the user focuses on the first visual stimulus 610 at the first virtual depth 614, with the left eye 502 directed along first left gaze vector 602, and the right eye 504 directed along first right gaze vector 606, and then rotates the eyes' gaze vectors to second left gaze vector 604 and second right gaze vector 608 to focus on the second visual stimulus 612 at second virtual depth 616, is the computing system put into a selection state (e.g., a brain-click) to execute a command associated with the second visual stimulus 612. The detection of the user's focus on the first visual stimulus 610 or the second visual stimulus 612 is enabled by a distinct characteristic visual modulation applied to each visual stimulus, and decoded from the user's neural signals when the visual stimulus is in focus (and not otherwise), as described in greater detail below with reference to example BCIs.

In some examples, vergence of the gaze vectors of the left eye 502 and right eye 504 is used exclusively to cause the user to perceive each virtual object at its respective virtual depth. However, in some examples, the focal distance of the virtual objects can also be adjusted (e.g., by means of dynamic ophthalmic lenses, as described above): presenting two virtual objects at different focal distances can also force the user's eyes to adjust the focus of their lenses to focus on only one virtual depth at a time, further strengthening the differentiating effect of the user's intentional focus.

In some examples, each of the two (or more) visual stimuli is distinguishable for the user by a visual marking that allows each to be identified and focused upon, also referred to herein as a visual anchor: for example, the first visual stimulus 610 can include a first visible feature (e.g., the letter "A", or a colored graphical element of a first color), and the second visual stimulus 612 can include a second visible feature (e.g., the letter "B", or a colored graphical element of a second color). By intentionally focusing the eyes on the first visible feature or the second visual feature, the user can bring the first visual stimulus 610 or second visual stimulus 612 into focus. Thus, each visual stimulus can include a visual anchor (which may be visually distinct from the visual anchors of any other visual stimuli presented at the same position in the user's field of view), as well as a characteristic modulation distinct from the modulation of each other visual stimulus presented at the same position in the user's field of view. In some examples, the modulation (e.g., temporal modulation, as described below) of a given visual stimulus can be applied to all or part of the visual anchor of the visual stimulus. In some examples, the modulation of a visual stimulus can be applied to visual elements of the visual stimulus separate from the visual anchor (e.g., a pattern of modulated visual elements). In some examples, the modulation of a visual stimulus can be applied to all or part of the visual anchor as well as other visual elements of the visual stimulus.

Figure 7:
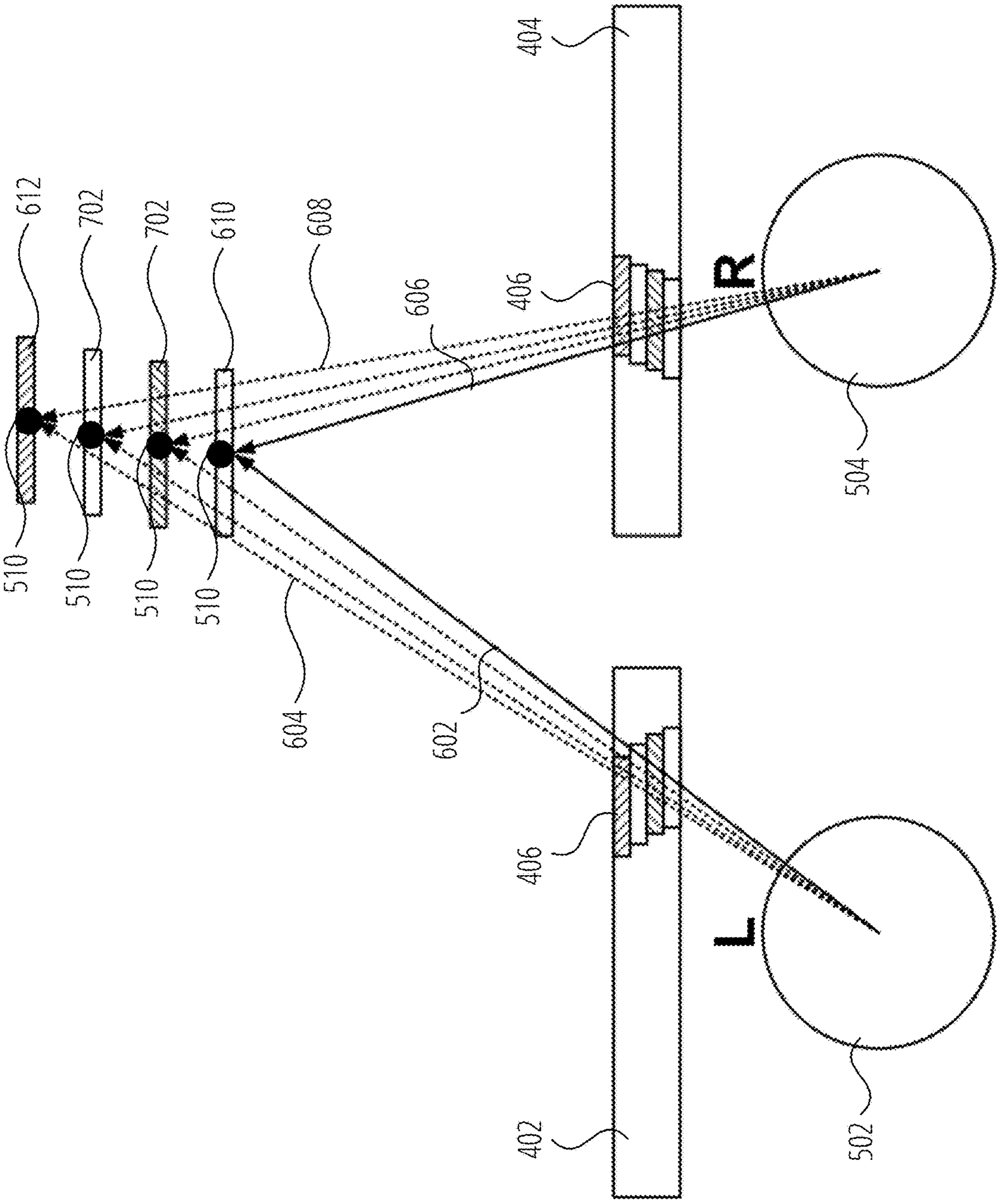
FIG. 7 is a top view of a left near-eye display and right near-eye display showing four distinct virtual depths of four visual stimuli, in accordance with some examples.

FIG. 7 shows a variant of FIG. 6 in which four visual stimuli are shown at four distinct virtual depths: between the first visual stimulus 610 and second visual stimulus 612 are two additional visual stimuli 702 at intermediate virtual depths between first virtual depth 614 and second virtual depth 616 (shown in FIG. 6).

In FIG. 7, the virtual content 406 presented by each near-eye display is shown as four distinct portions, corresponding to representations of the four visual stimuli, and are shown stacked for the sake of visibility; however, it will be appreciated that in reality these four representations are blended and overlapping within a single plane of the near-eye display.

In some examples, the user can shift focus backward and forward between the first virtual depth 614 and second virtual depth 616 to focus on each of the four visual stimuli successively. This allows the user to intentionally select from multiple virtual stimuli, each being associated with a different state or value used by the computing system. For example, the four visual stimuli ordered by increasing virtual depth (first visual stimulus 610, first additional visual stimulus 702, second additional visual stimulus 702, second visual stimulus 612) could be associated with four ascending values of a variable used by the computing system, such as audio volume of a speaker in the glasses 200 (e.g., 0% volume, 33% volume, 66% volume, 100% volume).

Figure 8:
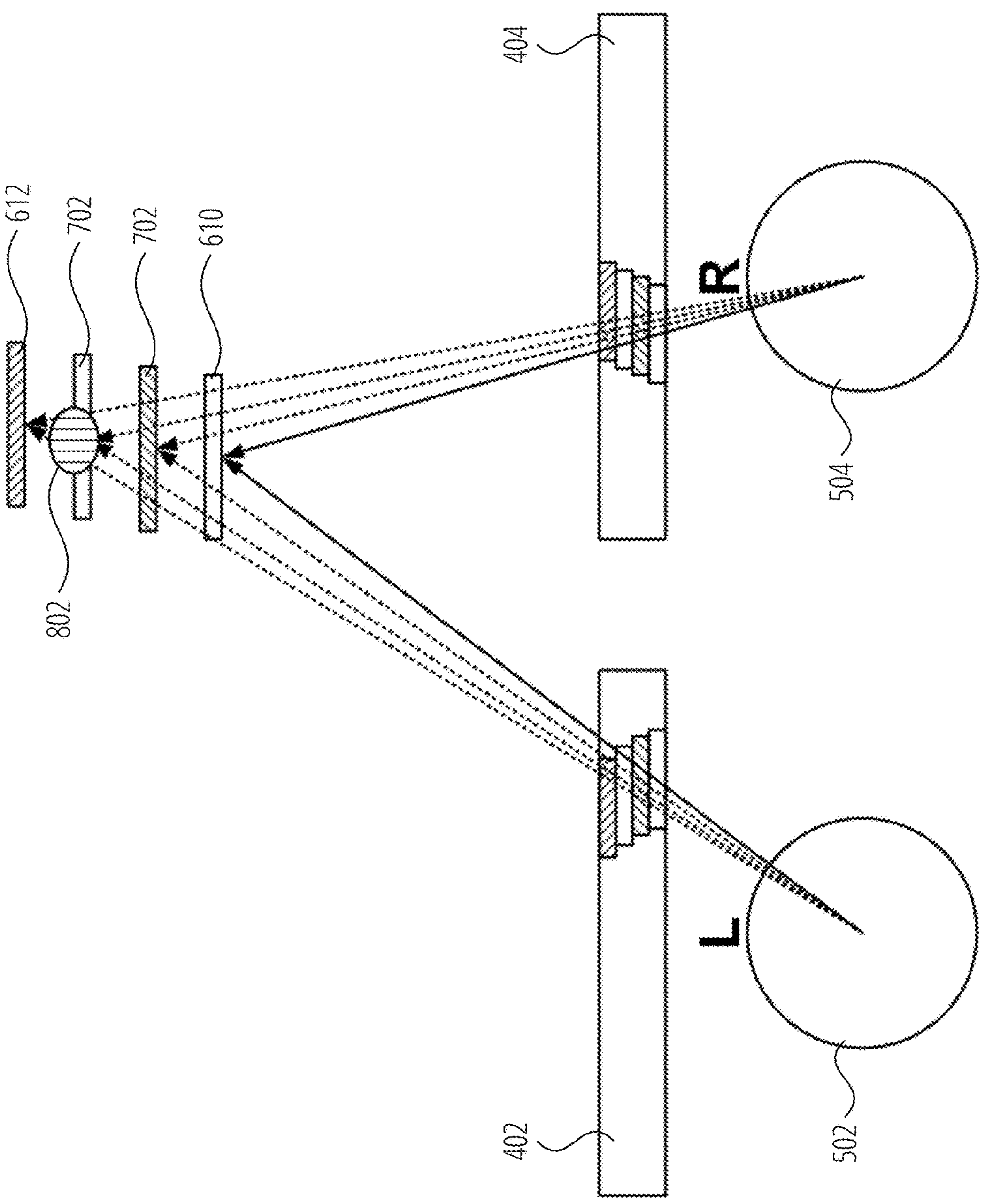
FIG. 8 is a top view of the left near-eye display and right near-eye display of FIG. 7, showing a real-world object at a real-world depth along with the four visual stimuli of FIG. 7, in accordance with some examples.

FIG. 8 shows the arrangement of multiple visual stimuli of FIG. 7, used in the context of a technique for measuring IPD. In this example, the user is prompted to focus both eyes 502 and 504) on a real-world object 802. The real-world depth of the real-world object 802 is assessed (e.g., using optical and/or depth sensors of the glasses 200, as described above).

At the same time, the four visual stimuli are presented at their four respective virtual depths, in the same position (e.g., first position 510) as the real-world object 802 within the user's field of view.

The BCI is used to decode the user's neural signals while the user's eyes are focused on the real-world object 802 to detect which characteristic modulation of which of the four visual stimuli is registered by the user's visual cortex. This in turn indicates which of the four visual stimuli is closest to the user's depth and position of focus: in this example, the farther of the two additional visual stimuli 702. Thus, the computing system can determine that the virtual depth of the second (farther) additional visual stimulus 702 is close to the real-world depth of the real-world object 802. Because perceived virtual depth of virtual content 406 is affected by IPD, the computing system can use the two known values (virtual depth of additional visual stimulus 702, and known real-world depth of real-world object 802) to calculate or estimate the user's IPD. Knowing the user's IPD can in turn be used to calibrate the display of virtual content 406 by the glasses 200.

Example BCIs and associated BCI techniques are described with reference to FIG. 9 through FIG. 12.

Figure 9:
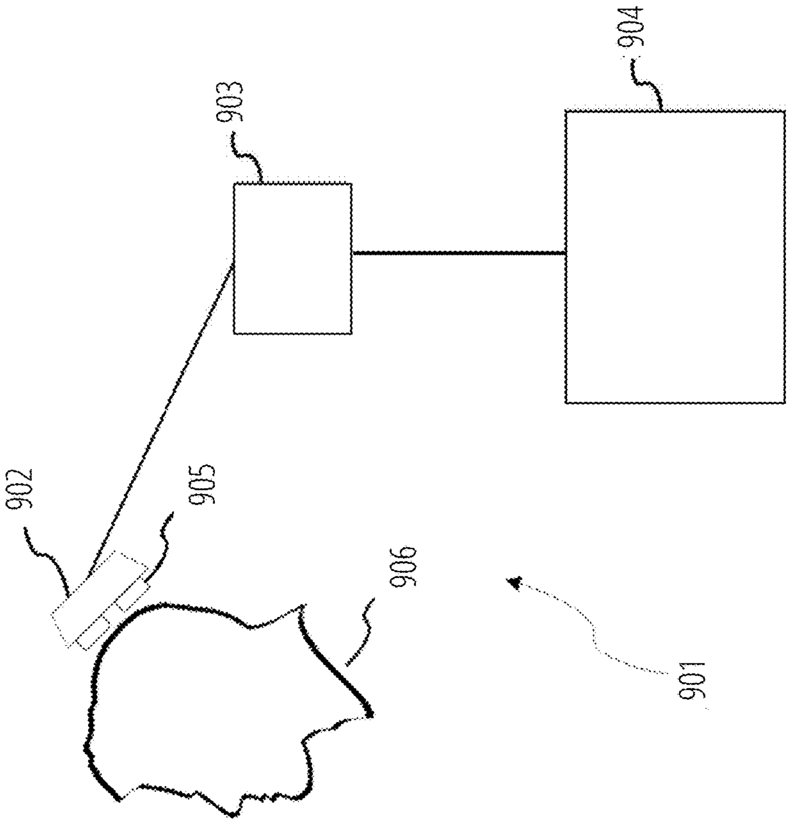
FIG. 9 illustrates an electronic architecture for receiving and processing EEG signals, in accordance with some examples.

FIG. 9 illustrates an example of an electronic architecture for the reception and processing of EEG signals by means of an EEG device 901 according to the present disclosure. In some examples, the EEG device 901 may be referred to herein as a neural signal capture device. However, it will be appreciated that some examples described herein could use a neural signal capture device of a different type or using different neural signal capture methodologies.

To measure diffuse electric potentials on the surface of the skull of a subject 906, the EEG device 901 includes a portable device 902 (i.e. a cap or headpiece), analog-digital conversion (ADC) circuit 903 and a microcontroller 904. The portable device 902 of FIG. 9 includes one or more electrodes 905, typically between 1 and 128 electrodes, such as between 2 and 64, such as between 4 and 16.

Each electrode 905 may comprise a sensor for detecting the electrical signals generated by the neuronal activity of the subject and an electronic circuit for pre-processing (e.g. filtering and/or amplifying) the detected signal before analog-digital conversion: such electrodes being termed "active". The electrodes 905 are shown in use in FIG. 9, where the sensor is in physical proximity with the subject's scalp. The electrodes may be suitable for use with a conductive gel or other conductive liquid (termed "wet" electrodes) or without such liquids (termed "dry" electrodes).

Each ADC circuit 903 is configured to convert the signals of a given number of electrodes 905, for example between 1 and 128.

The ADC circuits 903 are controlled by the microcontroller 904 and communicate with it, for example, by the SPI ("Serial Peripheral Interface") protocol. The microcontroller 904 packages the received data for transmission to an external processing unit (not shown), for example a computer (such as computer 220 of the glasses 200), a mobile phone, a virtual reality headset, an automotive or aeronautical computer system, for example a car computer or a computing system, by a wired or wireless communication link, for example by Bluetooth, Wi-Fi ("Wireless Fidelity") or Li-Fi ("Light Fidelity").

In certain embodiments, each active electrode 905 is powered by a battery (not shown in FIG. 9). The battery can be provided in a housing of the portable device 902.

In certain embodiments, each active electrode 905 measures a respective electric potential value from which the potential measured by a reference electrode (Ei=Vi-Vref) is subtracted, and this difference value is digitized by means of the ADC circuit 903 then transmitted by the microcontroller 904.

In certain embodiments, the methods described herein introduce target objects (e.g., visual stimuli and/or their visible features) for display in a graphical user interface of a display device. The target objects include control items and the control items are in turn associated with user-selectable actions.

Figure 10:
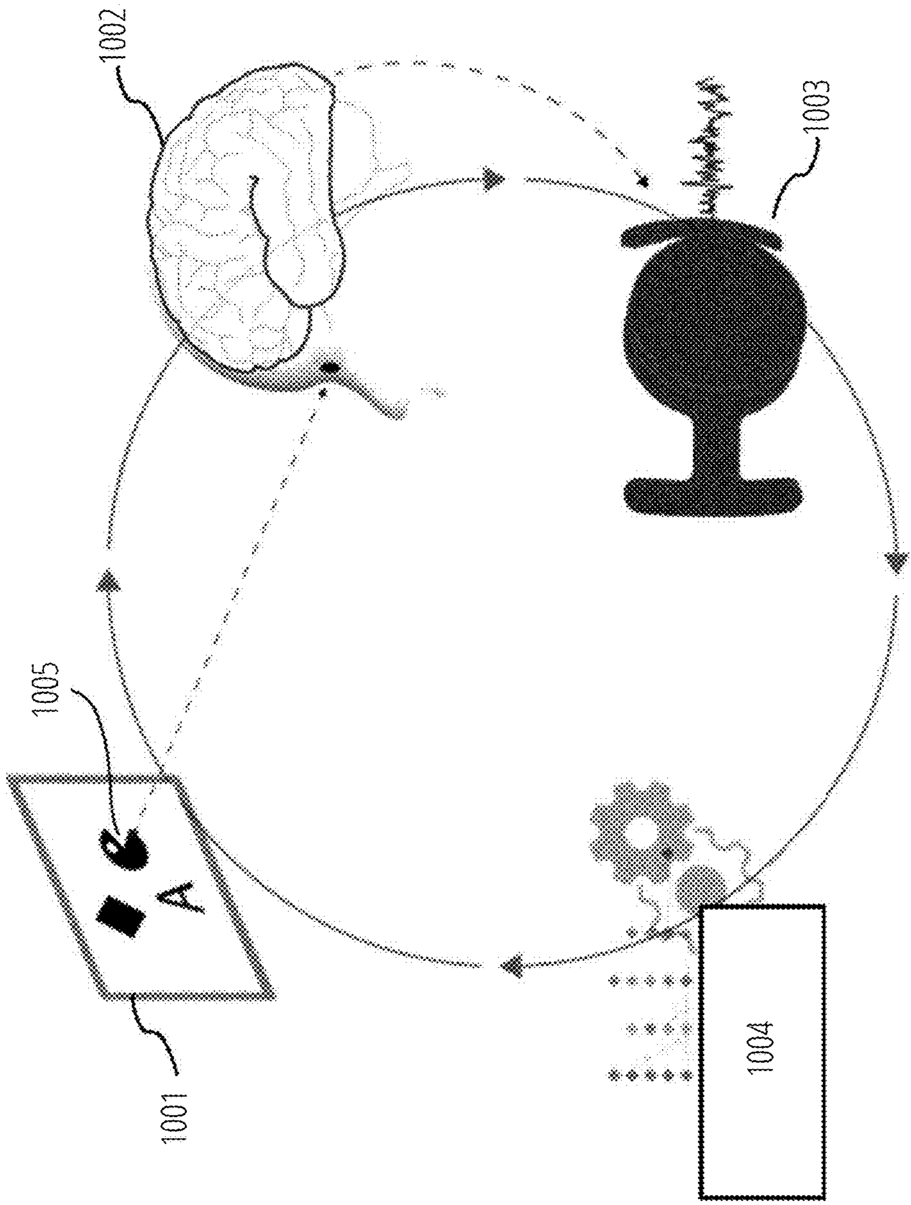
FIG. 10 illustrates a computing system incorporating a brain computer interface (BCI), in accordance with some examples.

FIG. 10 illustrates a computing system incorporating a brain computer interface (BCI) according to the present disclosure. The computing system incorporates a neural signal capture device 1003, such as the EEG device 901 illustrated in FIG. 9. In the computing system, an image is displayed on at least one display of a display device 1001, such as the left near-eye displays and right near-eye display of the glasses 200 of FIG. 2. In some examples, the computing system includes a display device such as the glasses 200, the BCI shown in FIG. 10, and optionally one or more computing devices in addition to the computer 220 of the glasses 200. The subject 1002 (also referred to as a user) views the image on at least one display of a display device 1001 (such as a binocular display device including the left near-eye display 402 and right near-eye display 404), focusing on a target object 1005.

In some examples, the display device 1001 displays at least the target object 1005 (e.g., a visual stimulus such as first visual stimulus 610 or second visual stimulus 612 of FIG. 6) as a graphical object with a varying temporal characteristic distinct from the temporal characteristic of other displayed objects and/or the background in the display. The varying temporal characteristic may be, for example, a constant or time-locked flickering effect altering the appearance of the target object at a rate greater than 6 Hz. Where more than one graphical object is a potential target object (i.e. where the viewing subject is offered a choice of target object to focus attention on, such as first visual stimulus 610 and second visual stimulus 612), each object is associated with a discrete spatial and/or temporal code.

The neural signal capture device 1003 detects neural responses (i.e. tiny electrical potentials indicative of brain activity in the visual cortex) associated with attention focused on the target object; the visual perception of the varying temporal characteristic of the target object(s) therefore acts as a stimulus in the subject's brain, generating a specific brain response that accords with the code associated with the target object in attention. The detected neural responses (e.g. electrical potentials) are then converted into signals and transferred to a processing device 1004 for decoding. Examples of neural responses include visual evoked potentials (VEPs), which are commonly used in neuroscience research. The term VEPs encompasses conventional SSVEPs, as mentioned above, where stimuli oscillate at a specific frequency and other methods such as the code-modulated VEP, stimuli are subject to a variable or pseudo-random temporal code.

The processing device 1004 executes instructions that interpret the received neural signals to determine feedback indicating the target object having the current focus of (visual) attention (e.g., both eyes having their gaze converged on the target object, and both eyes being focused on the target object) in real time. Decoding the information in the neural response signals relies upon a correspondence between that information and one or more aspects of the temporal profile of the target object (i.e. the stimulus).

In certain embodiments, the processing device may conveniently generate the image data presented on the display device 1001 including the temporally varying target object.

The feedback may conveniently be presented visually on the display screen. For example, the display device may display an icon, cursor, crosshair or other graphical object or effect in close proximity to the target object (or overlapping or at least partially occluding that object), highlighting the object that appears to be the current focus of visual attention. Clearly, the visual display of such feedback has a reflexive cognitive effect on the perception of the target object, amplifying the brain response. This positive feedback (where the apparent target object is confirmed as the intended target object by virtue of prolonged amplified attention) is referred to herein as "neurosynchrony".

FIG. 11 illustrates the use of a neural response device such as that in FIG. 9 and FIG. 10 in discriminating between a plurality of target objects. The neural response device worn by the user (e.g. viewer 1104 in FIG. 11) is an electrode helmet for an EEG device (such as EEG device 901). Here, the user wearing the helmet views a screen 1101 displaying a plurality of target objects (the digits in an on-screen keypad), which are blinking at distinctly different times, frequencies and/or duty cycles. The electrode helmet can convey a signal derived from the user's neural activity. Here, the user is focusing on the digit "5", 1105, where at time t1 the digit "3", 1107, blinks, at time t2 the digit "4", 1108, blinks, at time t3 the digit "5", 1106, blinks, and at time t4, the digit "6", 1109, blinks. The neural activity as conveyed by the helmet signal would be distinctly different at t3 than at the other points in time. That is because the user is focusing on digit "5", 1105, which blinks on, 1106, at t3. However, to differentiate that signal occurring at t3 with those at the other times, all the objects on the screen must blink at distinctively different times. Thus, the screen would be alive with blinking objects making for an uncomfortable viewing experience.

Figure 12:
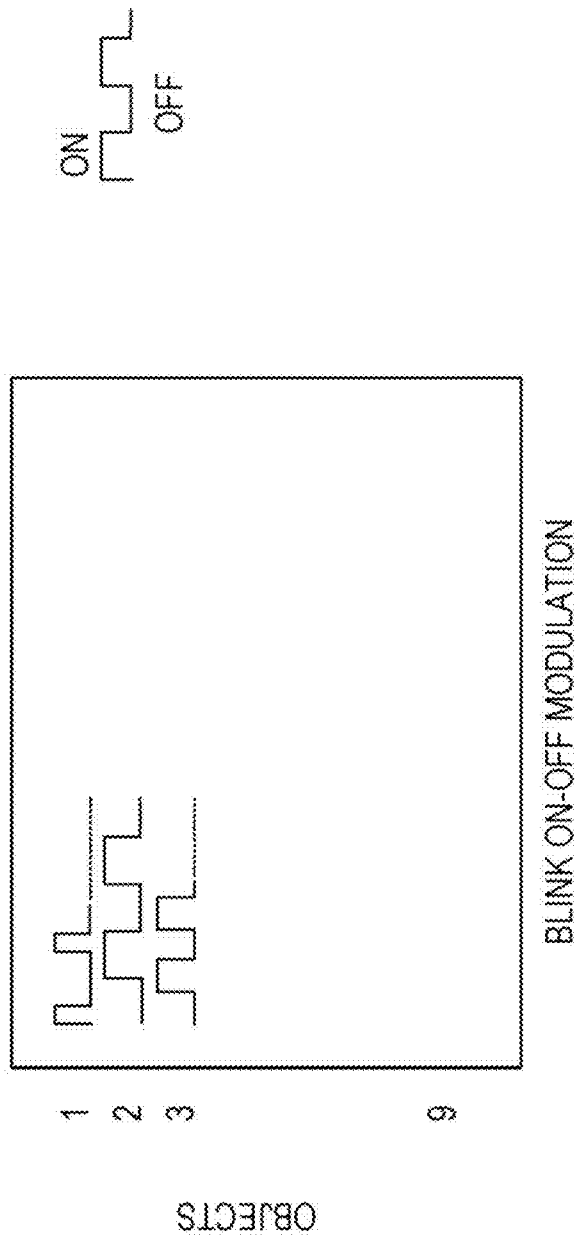
FIG. 12 is an example of a blink control pattern in which the objects are each given blinking patterns that are distinctive in terms of start time, frequency and duty cycle, in accordance with some examples.

The system in FIG. 11 could be using a display signal pattern such as the exemplary pattern shown in FIG. 12 where the screen objects will blink at different points in time, with different frequencies and duty cycles.

It will be appreciated that, whereas the BCI techniques described herein use a temporal on/off blinking modulation scheme to associate distinct and characteristic temporal modulation to each visual stimulus (e.g., each digit of the on-screen keyboard of FIG. 11), in some examples other visual modulation schemes can be used to enable a BCI device to decode neural signals to detect when visual attention is focused on a given visual stimulus. For example, different temporal modulation waveforms from the pattern shown in FIG. 12 can be used in some cases, such as sinusoidal wave patterns having various frequencies and phases, minimally correlated signals, and so on.

Figure 13:
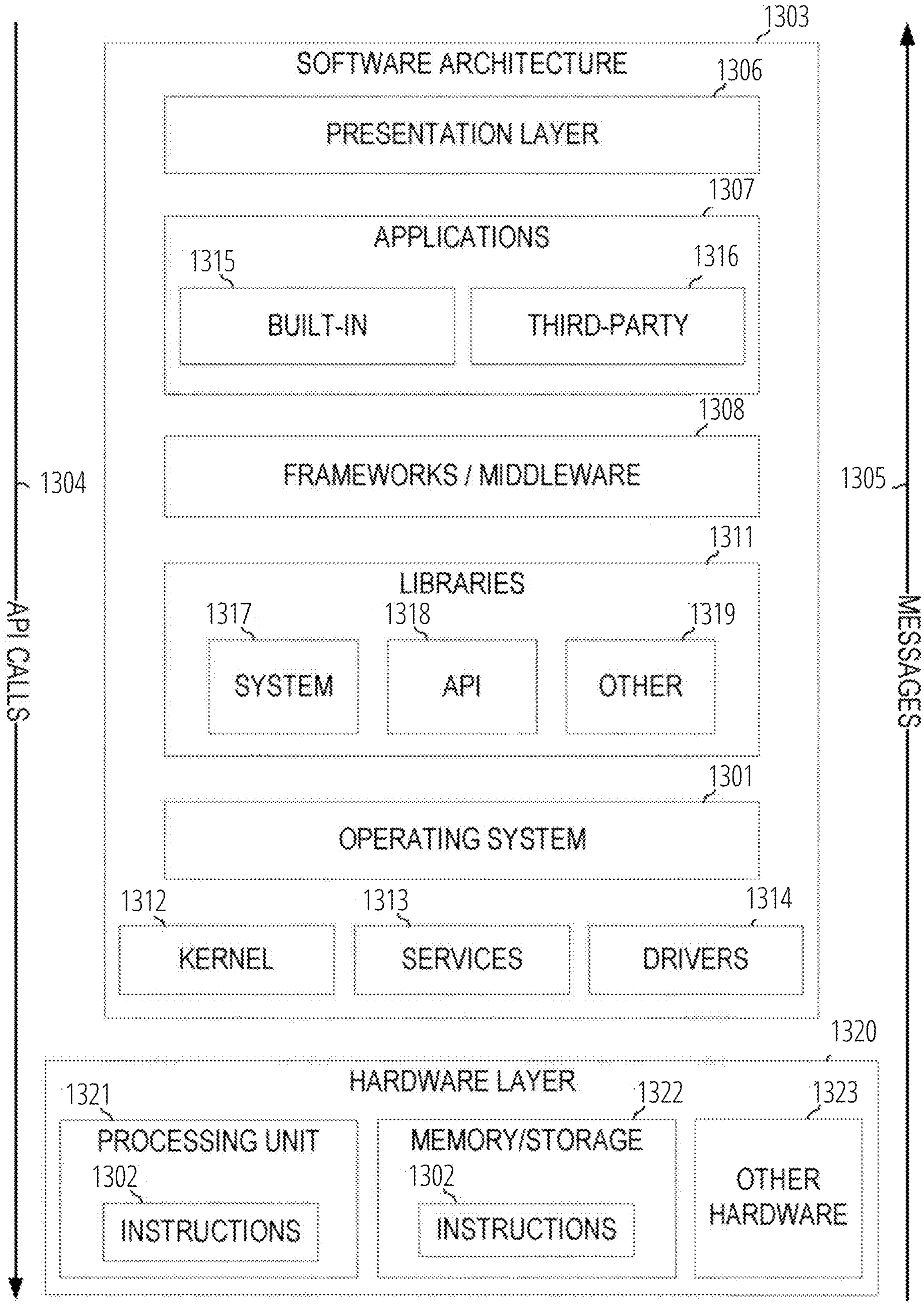
FIG. 13 is a block diagram showing a software architecture within which the present disclosure may be implemented, in accordance with some examples.

FIG. 13 is a block diagram illustrating an example software architecture 1303, which may be used in conjunction with various hardware architectures herein described. FIG. 13 is a non-limiting example of a software architecture and it will be appreciated that many other architectures may be implemented to facilitate the functionality described herein. The software architecture 1303 may execute on hardware such as machine 1400 of FIG. 14 that includes, among other things, processors 1404, memory 1406, and input/output (I/O) components 1418. A representative hardware layer 1320 is illustrated and can represent, for example, the machine 1400 of FIG. 14. The representative hardware layer 1320 includes a processing unit 1321 having associated executable instructions 1302. The executable instructions 1302 represent the executable instructions of the software architecture 1303, including implementation of the methods, modules and so forth described herein. The hardware layer 1320 also includes memory and/or storage modules shown as memory/storage 1322, which also have the executable instructions 1302. The hardware layer 1320 may also comprise other hardware 1323, for example dedicated hardware for interfacing with EEG electrodes and/or for interfacing with display devices.

In the example architecture of FIG. 13, the software architecture 1303 may be conceptualized as a stack of layers where each layer provides particular functionality. For example, the software architecture 1303 may include layers such as an operating system 1301, libraries 1311, frameworks or middleware 1309, applications 1307 and a presentation layer 1306. Operationally, the applications 1307 and/or other components within the layers may invoke application programming interface (API) calls 1304 through the software stack and receive a response as messages 1305. The layers illustrated are representative in nature and not all software architectures have all layers. For example, some mobile or special purpose operating systems may not provide the frameworks/middleware 1308, while others may provide such a layer. Other software architectures may include additional or different layers.

The operating system 1301 may manage hardware resources and provide common services. The operating system 1301 may include, for example, a kernel 1312, services 1313, and drivers 1314. The kernel 1312 may act as an abstraction layer between the hardware and the other software layers. For example, the kernel 1312 may be responsible for memory management, processor management (e.g., scheduling), component management, networking, security settings, and so on. The services 1313 may provide other common services for the other software layers. The drivers 1314 may be responsible for controlling or interfacing with the underlying hardware. For instance, the drivers 1314 may include display drivers, EEG device drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1311 may provide a common infrastructure that may be used by the applications 1307 and/or other components and/or layers. The libraries 1311 typically provide functionality that allows other software modules to perform tasks in an easier fashion than by interfacing directly with the underlying operating system 1301 functionality (e.g., kernel 1312, services 1313, and/or drivers 1314). The libraries 1311 may include system libraries 1317 (e.g., C standard library) that may provide functions such as memory allocation functions, string manipulation functions, mathematic functions, and the like. In addition, the libraries 1311 may include API libraries 1318 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1311 may also include a wide variety of other libraries 1319 to provide many other APIs to the applications 1307 and other software components/modules.

The frameworks 1310 (also sometimes referred to as middleware) provide a higher-level common infrastructure that may be used by the applications 1307 and/or other software components/modules. For example, the frameworks/middleware 1308 may provide various graphic user interface (GUI) functions, high-level resource management, high-level location services, and so forth. The frameworks/middleware 1308 may provide a broad spectrum of other APIs that may be used by the applications 1307 and/or other software components/modules, some of which may be specific to a particular operating system or platform.

The applications 1307 include built-in applications 1315 and/or third-party applications 1316.

The applications 1307 may use built-in operating system functions (e.g., kernel 1312, services 1313, and/or drivers 1314), libraries 1311, or frameworks/middleware 1308 to create user interfaces to interact with users of the system. Alternatively, or additionally, in some systems interactions with a user may occur through a presentation layer, such as the presentation layer 1306. In these systems, the application/module "logic" can be separated from the aspects of the application/module that interact with a user.

Figure 14:
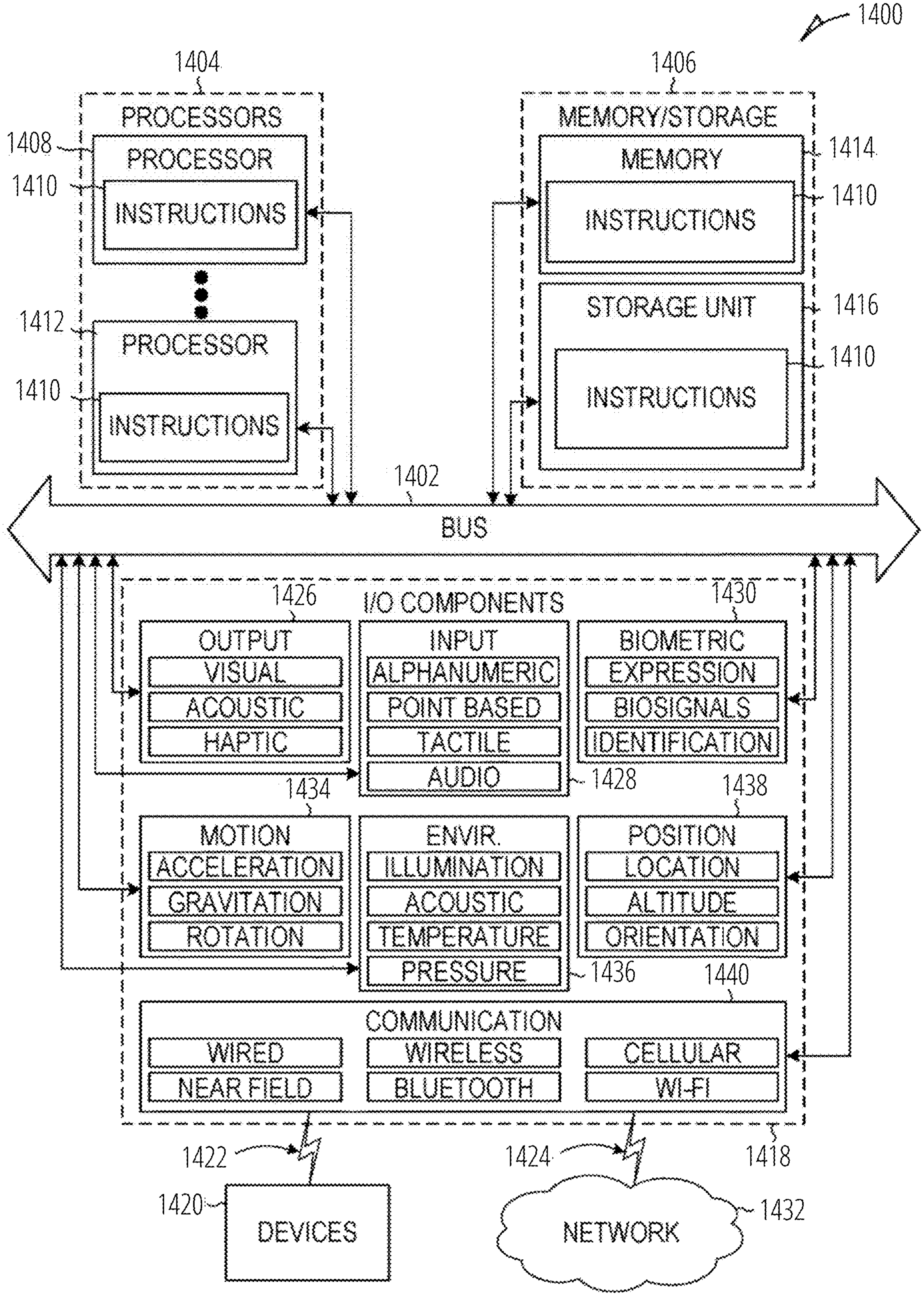
FIG. 14 is a diagrammatic representation of a machine, in the form of a computer system within which a set of instructions may be executed for causing the machine to perform any one or more of the methodologies discussed, in accordance with some examples.

FIG. 14 is a block diagram illustrating components of a machine 1400, according to some example embodiments, able to read instructions from a machine-readable medium (e.g., a machine-readable storage medium such as a non-transitory computer-readable storage medium) and perform any one or more of the methodologies discussed herein. Specifically, FIG. 14 shows a diagrammatic representation of the machine 1400 in the example form of a computing system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory 1406, and input/output (I/O) components 1418, which may be configured to communicate with each other such as via a bus 1402. In an example embodiment, the processors 1404 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that may execute the instructions 1410. The term "processor" is intended to include multi-core processor that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core processor), multiple processors with a single core, multiple processors with multiples cores, or any combination thereof.

The memory 1406 may include a memory 1414, such as a main memory, a static memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1410. The term "machine-readable medium" shall also be taken to include any medium, or combination of multiple media, that is capable of storing instructions (e.g., instructions 1410) for execution by a machine (e.g., machine 1400), such that the instructions, when executed by one or more processors of the machine 1400 (e.g., processors 1404), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1418 may include a wide variety of components to receive input, provide output, produce output, transmit information, exchange information, capture measurements, and so on. The specific input/output (I/O) components 1418 that are included in a particular machine will depend on the type of machine. For example, user interface machines and portable machines such as mobile phones will likely include a touch input device or other such input mechanisms, while a headless server machine will likely not include such a touch input device. It will be appreciated that the input/output (I/O) components 1418 may include many other components that are not shown in FIG. 14.

The input/output (I/O) components 1418 are grouped according to functionality merely for simplifying the following discussion and the grouping is in no way limiting. In various example embodiments, the input/output (I/O) components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the input/output (I/O) components 1418 may include biometric components 1430, motion components 1434, environment components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves, such as the output from an EEG device), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environmental environment components 1436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1418 may include communication components 1440 operable to couple the machine 1400 to a network 1432 or devices 1420 via a coupling 1424 and a coupling 1422 respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)). Where an EEG device or display device is not integral with the machine 1400, the device 1120 may be an EEG device and/or a display device.

Figure 15:
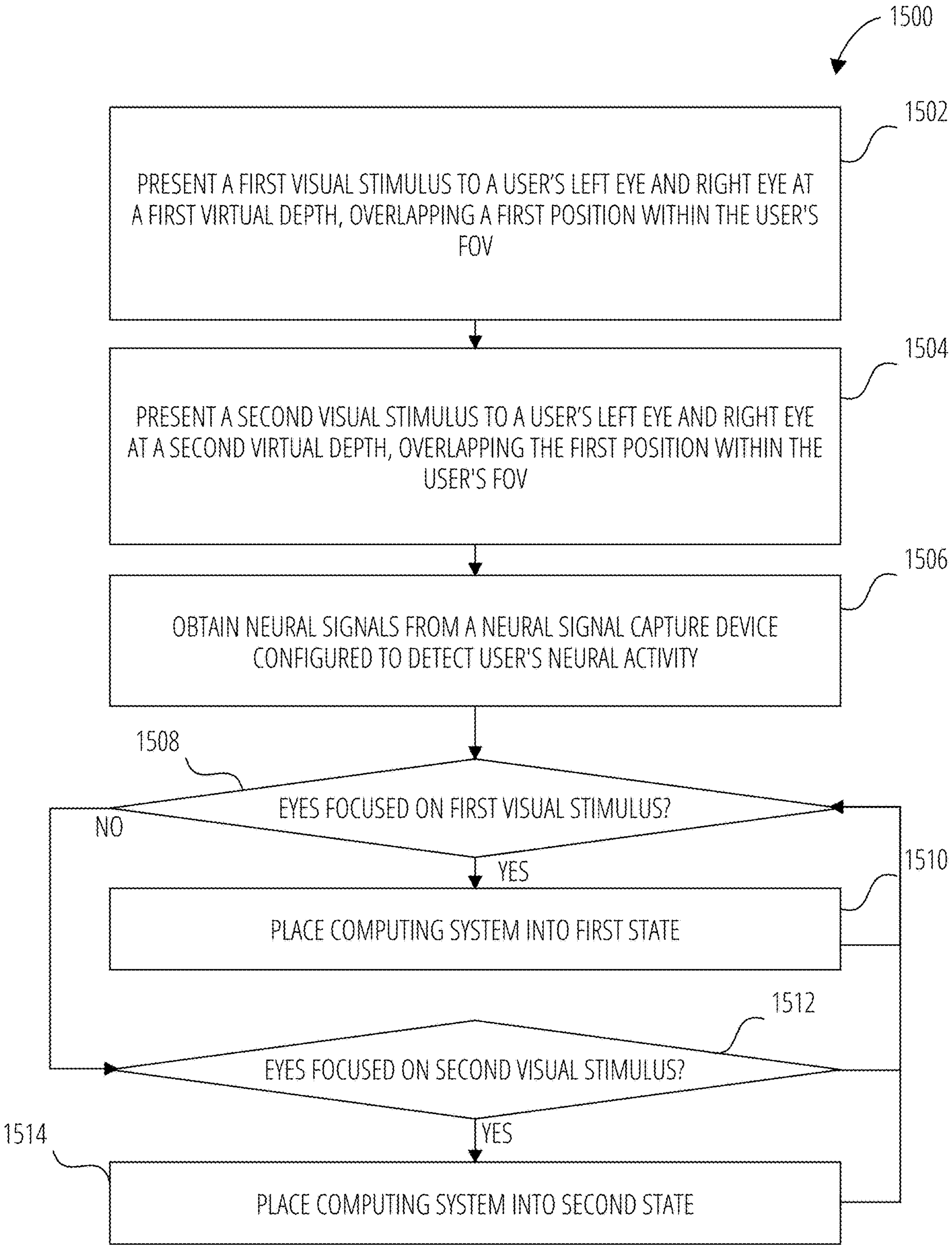
FIG. 15 is a flowchart illustrating operations of a method for detecting intentional selection of a user interface element using a binocular display, in accordance with some examples.

FIG. 15 is a flowchart illustrating operations of a method for detecting intentional selection of a user interface element using a binocular display. Whereas the method 1500 is described in reference to the example BCIs, devices, systems, and visual stimuli illustrated in the foregoing figures, it will be appreciated that method 1500 can be performed by any suitable computing system having a binocular or stereoscopic display and a BCI.

Although the example method 1500 depicts a particular sequence of operations, the sequence may be altered without departing from the scope of the present disclosure. For example, some of the operations depicted may be performed in parallel or in a different sequence that does not materially affect the function of the method 1500. In other examples, different components of an example device or system that implements the method 1500 may perform functions at substantially the same time or in a specific sequence.

According to some examples, the method 1500 includes presenting a first visual stimulus 610 stereoscopically to a user's left eye 502 and right eye 504 at a first virtual depth 614 perceived by the user's depth perception, overlapping a first position 510 within the user's field of view, at operation 1502. For example, the first visual stimulus 610 can be presented by the left near-eye display 402 and right near-eye display 404 of the glasses 200 as described above with reference to FIG. 6. Method 1500 then proceeds to operation 1504.

According to some examples, the method 1500 includes presenting a second visual stimulus 612 stereoscopically to the user's left eye 502 and right eye 504 at a second virtual depth 616 perceived by the user's depth perception, overlapping the first position 510 within the user's field of view, at operation 1504. For example, the second visual stimulus 612 can be presented by the left near-eye display 402 and right near-eye display 404 of the glasses 200 as described above with reference to FIG. 6. Method 1500 then proceeds to operation 1506.

According to some examples, the method 1500 includes obtaining neural signals from a neural signal capture device (such as EEG device 901) configured to detect the user's neural activity, at operation 1506. For example, the neural signals can be obtained as described above with reference to FIG. 9 through FIG. 12. Method 1500 then proceeds to operation 1508.

According to some examples, the method 1500 includes determining, based on the neural signals, whether the user's eyes are focused on the first visual stimulus 610, at operation 1508. If so, method 1500 then proceeds to operation 1510. If not, method 1500 then proceeds to operation 1512.

For example, the neural signals can be processed to determine whether the user's eyes are focused on the first visual stimulus 610 as described above with reference to FIG. 9 through FIG. 12. In some examples, this processing includes determining a strength of components of the neural signals having a property associated with the first modulation characterizing the first visual stimulus 610 (e.g., the blinking of first visual stimulus 610 at a specific time in the duty cycle described at FIG. 11 and FIG. 12).

According to some examples, the method 1500 includes placing the computing system into a first state, associated with the first visual stimulus 610, at operation 1510. Method 1500 then returns to operation 1508.

In some examples, as described above, the first state is an exploration state. In some examples, the exploration state may be distinctly associated with the first visual stimulus 610. In some examples, the first state may be a state in which a command associated with the first visual stimulus 610 is executed. In some examples, the first state may be a state in which a variable is assigned a value associated with the first visual stimulus 610, such as in the example of FIG. 8.

According to some examples, the method 1500 includes determining, based on the neural signals, whether the user's eyes are focused on the second visual stimulus at operation 1512. If so, method 1500 then proceeds to operation 1514. If not, method 1500 returns to operation 1508.

For example, the neural signals can be processed to determine whether the user's eyes are focused on the second visual stimulus 612 as described above with reference to FIG. 9 through FIG. 12. In some examples, this processing includes determining a strength of components of the neural signals having a property associated with the second modulation characterizing the second visual stimulus 612 (e.g., the blinking of second visual stimulus 612 at a specific time in the duty cycle described at FIG. 11 and FIG. 12).

According to some examples, the method 1500 includes placing the computing system into a second state, associated with the second visual stimulus 612, at operation 1514. Method 1500 then returns to operation 1508.

In some examples, as described above, the second state is a selection state. In some examples, the selection state may be distinctly associated with the second visual stimulus 612. In some examples, the second state may be a state in which a command associated with the second visual stimulus 612 is executed. In some examples, the second state may be a state in which a variable is assigned a value associated with the second visual stimulus 612, such as in the example of FIG. 8.

Figure 16:
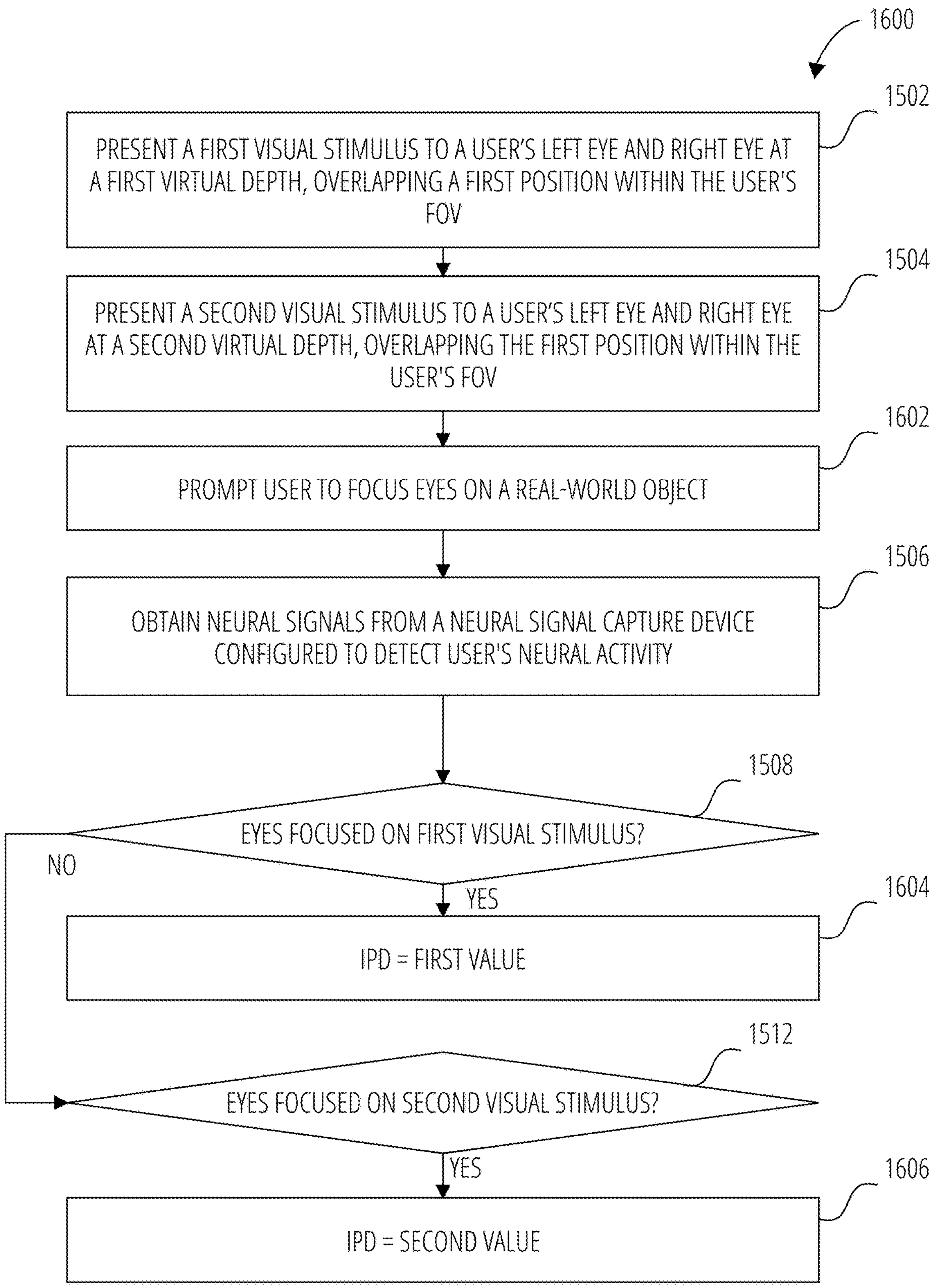
FIG. 16 is a flowchart illustrating operations of a method for determining the IPD of a user, in accordance with some examples.

FIG. 16 is a flowchart illustrating operations of a method for determining the IPD of a user. Whereas method 1600 is described in the context of the elements of FIG. 8 above, it will be appreciated that method 1600 can be performed by any suitable computing system having a binocular or stereoscopic display and a BCI.

Although the example method 1600 depicts a particular sequence of operations, the sequence may be altered without departing from the scope of the present disclosure. For example, some of the operations depicted may be performed in parallel or in a different sequence that does not materially affect the function of the method 1600. In other examples, different components of an example device or system that implements the method 1600 may perform functions at substantially the same time or in a specific sequence.

Some of the operations of method 1600 are functionally similar to operations of method 1500, as indicated by their reference numerals. In particular, operation 1502, operation 1504, operation 1506, operation 1508 (except as indicated below), and operation 1512 are functionally similar to their identically-numbered counterparts in FIG. 15.

After operation 1504, method 1600 proceeds to operation 1602.

According to some examples, the method 1600 includes prompting the user to focus the left eye and right eye on a real-world object 802 at a known (e.g., predetermined or measured) real-world depth at operation 1602. For example, the real-world depth can be continuously measured by sensors (as described above) and compared to the virtual depth of the visual stimulus in focus, as described below. Method 1600 then proceeds to operation 1506.

At operation 1508, if the user's eyes are determined, based on the neural signals, to be focused on the first visual stimulus 610, method 1600 proceeds to operation 1604. Otherwise, method 1600 proceeds to operation 1512.

According to some examples, the method 1600 includes determining that the user's IPD is equal to a first value at operation 1604. The first value may be stored, e.g., in a memory of the computing system, for use in calibrating the display of virtual content 406 by the computing system.

At operation 1512, if the user's eyes are determined, based on the neural signals, to be focused on the second visual stimulus 612, method 1600 proceeds to operation 1606.

According to some examples, the method 1600 includes determining that the user's IPD is equal to a second value at operation 1604. The second value may be stored, e.g., in a memory of the computing system, for use in calibrating the display of virtual content 406 by the computing system.

Glossary

"Extended reality" (XR) refers, for example, to an interactive experience of a real-world environment where physical objects that reside in the real-world are "augmented" or enhanced by computer-generated digital content (also referred to as virtual content or synthetic content). XR can also refer to a system that enables a combination of real and virtual worlds, real-time interaction, and 3D registration of virtual and real objects. A user of an XR system perceives virtual content that appears to be attached to, or interacts with, a real-world physical object.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporancously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Stereoscopic vision" refers to how the human visual system uses the differences between the images seen by each eye to figure out how far away objects are and their three-dimensional shapes and orientations. It is generally believed that noticing these side-to-side differences is what allows us to perceive depth.

"User device" refers, for example, to a device accessed, controlled or owned by a user and with which the user interacts perform an action, or an interaction with other users or computer systems.

EXAMPLES

To better illustrate the systems and methods disclosed herein, a non-limiting list of examples is provided here:

Example 1 is a method, comprising: presenting a first visual stimulus to a user's eyes, the first visual stimulus being presented stereoscopically at a first virtual depth perceived by the user's depth perception and overlapping a first position within a field of view of the user; presenting a second visual stimulus to the user's eyes, the second visual stimulus being presented stereoscopically at a second virtual depth perceived by the user's depth perception and overlapping the first position within the field of view of the user; obtaining neural signals from a neural signal capture device configured to detect neural activity of the user; in response to determining, based on the neural signals, that the user's eyes are focused on the first visual stimulus, placing a computing system into a first state associated with the first visual stimulus; and in response to determining, based on the neural signals, that the eyes are focused on the second visual stimulus, placing the computing system into a second state associated with the second visual stimulus.

In Example 2, the subject matter of Example 1 includes, wherein: the second virtual depth is greater than the first virtual depth.

In Example 3, the subject matter of Examples 1-2 includes, wherein: the presenting of the first visual stimulus at the first virtual depth comprises: presenting the first visual stimulus to the user's eyes at respective locations requiring vergence of the user's eyes at a first vergence corresponding to the first virtual depth in order for the user's eyes to focus on the first visual stimulus; and the presenting of the second visual stimulus at the second virtual depth comprises: presenting the second visual stimulus to the user's eyes at respective locations requiring vergence of the user's eyes at a second vergence corresponding to the second virtual depth in order for the user's eyes to focus on the second visual stimulus.

In Example 4, the subject matter of Example 3 includes, wherein: the presenting of the first visual stimulus at the first virtual depth further comprises: presenting the first visual stimulus to the user's eyes at a first focal distance corresponding to the first virtual depth; and the presenting of the second visual stimulus at the second virtual depth further comprises: presenting the second visual stimulus to the user's eyes at a second focal distance corresponding to the second virtual depth.

In Example 5, the subject matter of Examples 1-4 includes, wherein: the first state is an exploration state; and the second state is a selection state in which a command associated with the second visual stimulus is executed by the computing system.

In Example 6, the subject matter of Example 5 includes, wherein: the computing system is only placed into the selection state associated with the second visual stimulus if the computing system is currently in the exploration state associated with the first visual stimulus.

In Example 7, the subject matter of Examples 1-6 includes, wherein: the first visual stimulus is presented with a first modulation; the second visual stimulus is presented with a second modulation; the determining that the user's eyes are focused on the first visual stimulus comprises: determining a strength of components of the neural signals having a property associated with the first modulation; and the determining that the user's eyes are focused on the second visual stimulus comprises: determining a strength of components of the neural signals having a property associated with the second modulation.

In Example 8, the subject matter of Examples 1-7 includes, presenting one or more additional visual stimuli to the user's eyes, the one or more additional visual stimuli being presented at one or more respective additional virtual distances and overlapping the first position within the user's field of view; and in response to determining, based on the neural signals, that the user's eyes are focused on a respective one of the additional visual stimuli, placing a computing system into a further state associated with the respective one of the additional visual stimuli.

In Example 9, the subject matter of Examples 1-8 includes, wherein: the first virtual depth and second virtual depth are each a respective function of an inter-pupillary distance (IPD) between a pupil of the user's right eye and a pupil of the user's left eye; the method further comprises prompting the user to focus both eyes on a real-world object at a known real-world depth; the first state is a state in which the user's IPD is determined to be a first value; and the second state is a state in which the user's IPD is determined to be a second value.

Example 10 is a computing system, comprising: at least one display device; a neural signal capture device configured to detect neural activity of a user; one or more processors; and a memory storing instructions that, when executed by the one or more processors, cause the computing system to perform operations comprising: presenting a first visual stimulus stereoscopically to the user's eyes via the at least one display device, the first visual stimulus being presented at a first virtual depth perceived by the user's depth perception and overlapping a first position within a field of view of the user; presenting a second visual stimulus stereoscopically to the user's eyes via the at least one display device, the second visual stimulus being presented at a second virtual depth perceived by the user's depth perception and overlapping the first position within the field of view of the user; obtaining neural signals of the user via the neural signal capture device; in response to determining, based on the neural signals, that the user's eyes are focused on the first visual stimulus, placing the computing system into a first state associated with the first visual stimulus; and in response to determining, based on the neural signals, that the user's eyes are focused on the second visual stimulus, placing the computing system into a second state associated with the second visual stimulus.

In Example 11, the subject matter of Example 10 includes, wherein: the second virtual depth is greater than the first virtual depth.

In Example 12, the subject matter of Examples 10-11 includes, wherein: the presenting of the first visual stimulus at the first virtual depth comprises: presenting the first visual stimulus to the eyes at respective locations requiring vergence of the eyes at a first vergence corresponding to the first virtual depth in order for the eyes to focus on the first visual stimulus; and the presenting of the second visual stimulus at the second virtual depth comprises: presenting the second visual stimulus to the eyes at respective locations requiring vergence of the eyes at a second vergence corresponding to the second virtual depth in order for the eyes to focus on the second visual stimulus.

In Example 13, the subject matter of Example 12 includes, wherein: the presenting of the first visual stimulus at the first virtual depth further comprises: presenting the first visual stimulus to the eyes at a first focal distance corresponding to the first virtual depth; and the presenting of the second visual stimulus at the second virtual depth further comprises: presenting the second visual stimulus to the eyes at a second focal distance corresponding to the second virtual depth.

In Example 14, the subject matter of Examples 10-13 includes, wherein: the first state is an exploration state; and the second state is a selection state in which a command associated with the second visual stimulus is executed by the computing system.

In Example 15, the subject matter of Example 14 includes, wherein: the computing system is only placed into the selection state associated with the second visual stimulus if the computing system is currently in the exploration state associated with the first visual stimulus.

In Example 16, the subject matter of Examples 10-15 includes, wherein: the first visual stimulus is presented with a first modulation; the second visual stimulus is presented with a second modulation; the determining that the user's eyes are focused on the first visual stimulus comprises: determining a strength of components of the neural signals having a property associated with the first modulation; and the determining that the user's left eye and right eye are focused on the second visual stimulus comprises: determining a strength of components of the neural signals having a property associated with the second modulation.

In Example 17, the subject matter of Examples 10-16 includes, wherein the operations further comprise: presenting one or more additional visual stimuli to the user's eyes, the one or more additional visual stimuli being presented at one or more respective additional virtual distances and overlapping the first position within the user's field of view; and in response to determining, based on the neural signals, that the user's eyes are focused on a respective one of the additional visual stimuli, placing a computing system into a further state associated with the respective one of the additional visual stimuli.

In Example 18, the subject matter of Examples 10-17 includes, wherein: the first virtual depth and second virtual depth are each a respective function of an inter-pupillary distance (IPD) between a pupil of the user's right eye and a pupil of the user's left eye; the operations further comprise prompting the user to focus the left eye and right eye on a real-world object at a known real-world depth; the first state is a state in which the user's IPD is determined to be a first value; and the second state is a state in which the user's IPD is determined to be a second value.

In Example 19, the subject matter of Examples 10-18 includes, wherein: the at least one display device comprises: a left near-eye display for presenting the first visual stimulus and second visual stimulus to the left eye; and a right near-eye display for presenting the first visual stimulus and second visual stimulus to the right eye.

Example 20 is a non-transitory computer-readable storage medium storing instructions that, when executed by one or more processors of a computing system, cause the computing system to perform operations comprising: presenting a first visual stimulus stereoscopically to a user's eyes, the first visual stimulus being presented at a first virtual depth perceived by the user's depth perception and overlapping a first position within a field of view of the user; presenting a second visual stimulus stereoscopically to the eyes, the second visual stimulus being presented at a second virtual depth perceived by the user's depth perception and overlapping the first position within the field of view of the user; obtaining neural signals from a neural signal capture device configured to detect neural activity of the user; in response to determining, based on the neural signals, that the user's eyes are focused on the first visual stimulus, placing the computing system into a first state associated with the first visual stimulus; and in response to determining, based on the neural signals, that the user's eyes are focused on the second visual stimulus, placing the computing system into a second state associated with the second visual stimulus.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Further particular and preferred aspects of the present disclosure are set out in the accompanying independent and dependent claims. It will be appreciated that features of the dependent claims may be combined with features of the independent claims in combinations other than those explicitly set out in the claims.

The invention claimed is:

1. A method, comprising:

presenting a first visual stimulus to a user's eyes with a first modulation, the first visual stimulus being presented stereoscopically at a first virtual depth perceived by the user's depth perception and overlapping a first position within a field of view of the user;

presenting a second visual stimulus to the user's eyes with a second modulation, the second visual stimulus being presented stereoscopically at a second virtual depth perceived by the user's depth perception and overlapping the first position within the field of view of the user, such that the first and second visual stimuli occupy a common angular region of the field of view at different virtual depths;

obtaining neural signals from a neural signal capture device configured to detect neural activity of the user;

in response to determining, based on the neural signals, that the user's eyes are focused on the first visual stimulus by determining a strength of components of the neural signals having a property associated with the first modulation, placing a computing system into a first state associated with the first visual stimulus; and in response to determining, based on the neural signals, that the eyes are focused on the second visual stimulus by determining a strength of components of the neural signals having a property associated with the second modulation, placing the computing system into a second state associated with the second visual stimulus.

2. The method of claim 1, wherein:

the second virtual depth is greater than the first virtual depth.

3. The method of claim 1, wherein:

the presenting of the first visual stimulus at the first virtual depth comprises:

presenting the first visual stimulus to the user's eyes at respective locations requiring vergence of the user's eyes at a first vergence corresponding to the first virtual depth in order for the user's eyes to focus on the first visual stimulus; and the presenting of the second visual stimulus at the second virtual depth comprises:

presenting the second visual stimulus to the user's eyes at respective locations requiring vergence of the user's eyes at a second vergence corresponding to the second virtual depth in order for the user's eyes to focus on the second visual stimulus.

4. The method of claim 3, wherein:

the presenting of the first visual stimulus at the first virtual depth further comprises:

presenting the first visual stimulus to the user's eyes at a first focal distance corresponding to the first virtual depth; and the presenting of the second visual stimulus at the second virtual depth further comprises:

presenting the second visual stimulus to the user's eyes at a second focal distance corresponding to the second virtual depth.

5. The method of claim 1, wherein:

the first state is an exploration state; and the second state is a selection state in which a command associated with the second visual stimulus is executed by the computing system.

6. The method of claim 5, wherein:

the computing system is only placed into the selection state associated with the second visual stimulus if the computing system is currently in the exploration state associated with the first visual stimulus.

7. The method of claim 1, wherein:

the first modulation comprises a temporal modulation having a first duty cycle; and the second modulation comprises a temporal modulation having a second duty cycle.

8. The method of claim 1, further comprising:

presenting one or more additional visual stimuli to the user's eyes, the one or more additional visual stimuli being presented at one or more respective additional virtual distances and overlapping the first position within the user's field of view; and in response to determining, based on the neural signals, that the user's eyes are focused on a respective one of the additional visual stimuli, placing a computing system into a further state associated with the respective one of the additional visual stimuli.

9. The method of claim 1, wherein:

the first virtual depth and second virtual depth are each a respective function of an inter-pupillary distance (IPD) between a pupil of the user's right eye and a pupil of the user's left eye;

the method further comprises prompting the user to focus both eyes on a real-world object at a known real-world depth;

the first state is a state in which the user's IPD is determined to be a first value; and the second state is a state in which the user's IPD is determined to be a second value.

10. A computing system, comprising:
at least one display device;
a neural signal capture device configured to detect neural activity of a user;
one or more processors; and
a memory storing instructions that, when executed by the one or more processors, cause the computing system to perform operations comprising:
presenting a first visual stimulus stereoscopically to the user's eyes with a first modulation via the at least one display device, the first visual stimulus being presented at a first virtual depth perceived by the user's depth perception and overlapping a first position within a field of view of the user;
presenting a second visual stimulus stereoscopically to the user's eyes with a second modulation via the at least one display device, the second visual stimulus being presented at a second virtual depth perceived by the user's depth perception and overlapping the first position within the field of view of the user, such that the first and second visual stimuli occupy a common angular region of the field of view at different virtual depths;
obtaining neural signals of the user via the neural signal capture device;
in response to determining, based on the neural signals, that the user's eyes are focused on the first visual stimulus by determining a strength of components of the neural signals having a property associated with the first modulation, placing the computing system into a first state associated with the first visual stimulus; and
in response to determining, based on the neural signals, that the user's eyes are focused on the second visual stimulus by determining a strength of components of the neural signals having a property associated with the second modulation, placing the computing system into a second state associated with the second visual stimulus.

11. The computing system of claim 10, wherein:
the second virtual depth is greater than the first virtual depth.

12. The computing system of claim 10, wherein:
the presenting of the first visual stimulus at the first virtual depth comprises:
presenting the first visual stimulus to the eyes at respective locations requiring vergence of the eyes at a first vergence corresponding to the first virtual depth in order for the eyes to focus on the first visual stimulus; and
the presenting of the second visual stimulus at the second virtual depth comprises:
presenting the second visual stimulus to the eyes at respective locations requiring vergence of the eyes at a second vergence corresponding to the second virtual depth in order for the eyes to focus on the second visual stimulus.

13. The computing system of claim 12, wherein:
the presenting of the first visual stimulus at the first virtual depth further comprises:
presenting the first visual stimulus to the eyes at a first focal distance corresponding to the first virtual depth; and
the presenting of the second visual stimulus at the second virtual depth further comprises:
presenting the second visual stimulus to the eyes at a second focal distance corresponding to the second virtual depth.

14. The computing system of claim 10, wherein:
the first state is an exploration state; and
the second state is a selection state in which a command associated with the second visual stimulus is executed by the computing system.

15. The computing system of claim 14, wherein:
the computing system is only placed into the selection state associated with the second visual stimulus if the computing system is currently in the exploration state associated with the first visual stimulus.

16. The computing system of claim 10, wherein:
the first modulation comprises a temporal modulation having a first duty cycle; and
the second modulation comprises a temporal modulation having a second duty cycle.

17. The computing system of claim 10, wherein the operations further comprise:
presenting one or more additional visual stimuli to the user's eyes, the one or more additional visual stimuli being presented at one or more respective additional virtual distances and overlapping the first position within the user's field of view; and
in response to determining, based on the neural signals, that the user's eyes are focused on a respective one of the additional visual stimuli, placing a computing system into a further state associated with the respective one of the additional visual stimuli.

18. The computing system of claim 10, wherein:
the first virtual depth and second virtual depth are each a respective function of an inter-pupillary distance (IPD) between a pupil of the user's right eye and a pupil of the user's left eye;
the operations further comprise prompting the user to focus the left eye and right eye on a real-world object at a known real-world depth;
the first state is a state in which the user's IPD is determined to be a first value; and
the second state is a state in which the user's IPD is determined to be a second value.

19. The computing system of claim 10, wherein:
the at least one display device comprises:
a left near-eye display for presenting the first visual stimulus and second visual stimulus to the left eye; and
a right near-eye display for presenting the first visual stimulus and second visual stimulus to the right eye.

20. A non-transitory computer-readable storage medium storing instructions that, when executed by one or more processors of a computing system, cause the computing system to perform operations comprising:
presenting a first visual stimulus stereoscopically to a user's eyes with a first modulation, the first visual stimulus being presented at a first virtual depth perceived by the user's depth perception and overlapping a first position within a field of view of the user;
presenting a second visual stimulus stereoscopically to the eyes with a second modulation, the second visual stimulus being presented at a second virtual depth perceived by the user's depth perception and overlapping the first position within the field of view of the user, such that the first and second visual stimuli occupy a common angular region of the field of view at different virtual depths;

obtaining neural signals from a neural signal capture device configured to detect neural activity of the user;

in response to determining, based on the neural signals, that the user's eyes are focused on the first visual stimulus by determining a strength of components of the neural signals having a property associated with the first modulation, placing the computing system into a first state associated with the first visual stimulus; and in response to determining, based on the neural signals, that the user's eyes are focused on the second visual stimulus by determining a strength of components of the neural signals having a property associated with the second modulation, placing the computing system into a second state associated with the second visual stimulus.

* * * * *